(12) United States Patent
Van Wie et al.

(10) Patent No.: US 12,041,103 B2
(45) Date of Patent: **\*Jul. 16, 2024**

(54) REALTIME COMMUNICATIONS AND NETWORK BROWSING CLIENT

(71) Applicant: Sococo, Inc., Boston, MA (US)

(72) Inventors: David Van Wie, Eugene, OR (US); Joseph Altmaier, North Liberty, IA (US)

(73) Assignee: Sococo, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/008,231

(22) Filed: Jun. 14, 2018

(65) Prior Publication Data

US 2018/0295170 A1 Oct. 11, 2018

Related U.S. Application Data

(63) Continuation of application No. 14/722,382, filed on May 27, 2015, now Pat. No. 10,003,624, which is a continuation of application No. 13/409,344, filed on Mar. 1, 2012, now Pat. No. 9,069,851.

(60) Provisional application No. 61/449,059, filed on Mar. 3, 2011.

(51) Int. Cl.
| | |
|---|---|
| *G06F 15/16* | (2006.01) |
| *G06F 16/95* | (2019.01) |
| *H04L 41/22* | (2022.01) |
| *H04L 47/283* | (2022.01) |
| *H04L 65/60* | (2022.01) |

(52) U.S. Cl.
CPC .............. *H04L 65/60* (2013.01); *G06F 16/95* (2019.01); *H04L 41/22* (2013.01); *H04L 47/283* (2013.01)

(58) Field of Classification Search
CPC ....... H04L 65/60; H04L 41/22; H04L 47/283; G06F 16/95
See application file for complete search history.

(56) References Cited

U.S. PATENT DOCUMENTS

| | | |
|---|---|---|
| 5,960,173 A | 9/1999 | Tang et al. |
| 6,271,839 B1 | 8/2001 | Mairs et al. |
| 7,124,164 B1 | 10/2006 | Chemtob |
| 7,240,093 B1 | 7/2007 | Danieli et al. |
| 8,869,027 B2 | 10/2014 | Louch et al. |
| 2001/0029520 A1 * | 10/2001 | Miyazaki ................ H04L 47/10 709/200 |
| 2004/0128350 A1 | 7/2004 | Topfl et al. |

(Continued)

FOREIGN PATENT DOCUMENTS

WO 03015057 A1 2/2003

*Primary Examiner* — Padma Mundur

(57) ABSTRACT

A graphical user interface is displayed. The graphical user interface includes at least one communication control for managing communications with other network nodes and at least one browser control for navigating to different network resource addresses. Human perceptible realtime output is generated from realtime communication data relating to a realtime communication session with at least one other client network node. In the process of generating of at least some of the human perceptible realtime output, operation of the client network node is managed based on at least one performance target. In the graphical user interface, a graphical representation of a network resource identified in connection with the browser control is displayed.

19 Claims, 11 Drawing Sheets

(56) References Cited

U.S. PATENT DOCUMENTS

| | | | |
|---|---|---|---|
| 2005/0149877 A1 | 7/2005 | Rice et al. | |
| 2007/0076621 A1* | 4/2007 | Malhotra | H04L 47/215 370/252 |
| 2007/0233785 A1 | 10/2007 | Abraham et al. | |
| 2008/0123546 A1* | 5/2008 | Isono | H04M 1/2535 370/252 |
| 2009/0113066 A1* | 4/2009 | Van Wie | H04L 12/1827 709/231 |
| 2009/0254843 A1* | 10/2009 | Van Wie | H04L 12/1822 715/757 |
| 2010/0080287 A1* | 4/2010 | Ali | H04N 19/166 375/240.03 |
| 2010/0257450 A1 | 10/2010 | Go et al. | |
| 2011/0228781 A1* | 9/2011 | Izenberg | H04L 47/2441 370/392 |
| 2012/0008496 A1* | 1/2012 | Saavedra | H04L 41/5019 370/231 |

\* cited by examiner

REALTIME COMMUNICATIONS AND NETWORK BROWSING CLIENT

CROSS-REFERENCE TO RELATED APPLICATIONS

This application is a continuation of U.S. patent application Ser. No. 14/722,382, filed May 27, 2015, which is a continuation of U.S. patent application Ser. No. 13/409,344, filed Mar. 1, 2012, which claims the benefit of U.S. Provisional Application No. 61/449,059, filed Mar. 3, 2011, the entirety of each of which is incorporated herein by reference.

This application relates to the following co-pending patent applications, the entirety of each of which is incorporated herein by reference: U.S. patent application Ser. No. 12/630,973, filed Dec. 4, 2009; U.S. patent application Ser. No. 12/418,243, filed Apr. 3, 2009; U.S. patent application Ser. No. 12/631,008, filed Dec. 4, 2009; U.S. patent application Ser. No. 12/631,026, filed Dec. 4, 2009; U.S. patent application Ser. No. 12/418,270, filed Apr. 3, 2009; U.S. patent application Ser. No. 12/825,512, filed Jun. 29, 2010; U.S. patent application Ser. No. 12/354,709, filed Jan. 15, 2009; U.S. patent application Ser. No. 12/694,126, filed Jan. 26, 2010; U.S. patent application Ser. No. 13/209,812, filed Aug. 15, 2011; U.S. patent application Ser. No. 13/229,349, filed Sep. 9, 2011; and U.S. patent application Ser. No. 13/229,395, filed Sep. 9, 2011.

BACKGROUND

When face-to-face communications are not practical, people often rely on one or more technological solutions to meet their communications needs. Traditional telephony systems enable voice communications between callers. Instant messaging (also referred to as "chat") communications systems enable users to communicate text messages in real time through instant message computer clients that are interconnected by an instant message server. Some instant messaging systems and interactive virtual reality communications systems allow users to be represented by user-controllable graphical objects (referred to as "avatars"). What are needed are improved systems and methods for realtime network communications.

DETAILED DESCRIPTION

Figure 1:
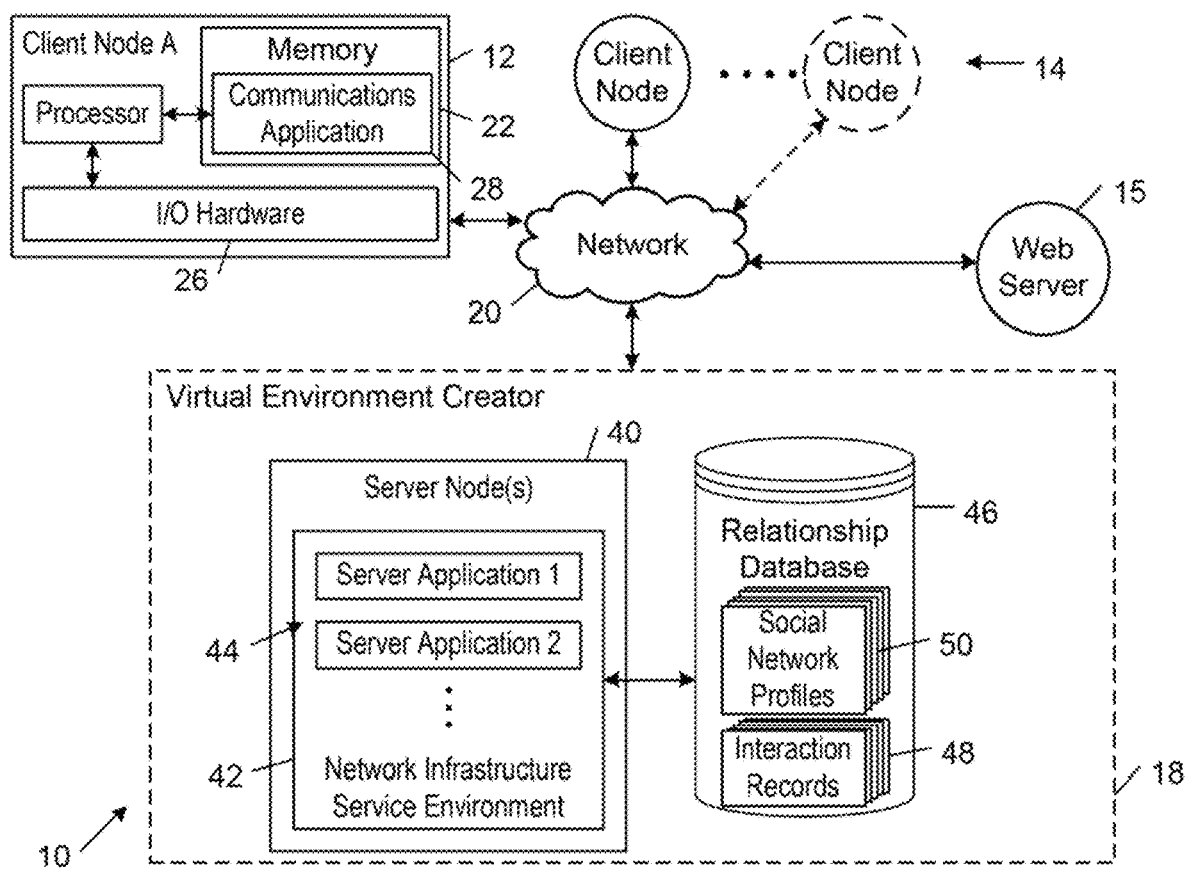
FIG. 1 is a diagrammatic view of an example of a network communications environment that includes a first client network node, one or more other client network nodes, and one or more server nodes.

In the following description, like reference numbers are used to identify like elements. Furthermore, the drawings are intended to illustrate major features of the described examples in a diagrammatic manner. The drawings are not intended to depict every feature of actual examples nor relative dimensions of the depicted elements, and are not drawn to scale.

I. Definition of Terms

A "communicant" is a person who communicates or otherwise interacts with other persons over one or more network connections, where the communication or interaction may or may not occur in the context of a virtual area. A "user" is a communicant who is operating a particular network node that defines a particular perspective for descriptive purposes.

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" refers to any tangible, non-transitory medium capable storing information (e.g., instructions and data) that is readable by a machine (e.g., a computer). Storage devices suitable for tangibly embodying such information include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, DVD-ROM/RAM, and CD-ROM/RAM.

A "window" is a visual area of a display that typically includes a user interface. A window typically displays the output of a software process and typically enables a user to input commands or data for the software process. A window that has a parent is called a "child window." A window that has no parent, or whose parent is the desktop window, is called a "top-level window." A "desktop" is a system-defined window that paints the background of a graphical user interface (GUI) and serves as the base for all windows displayed by all software processes.

A "data sink" (referred to herein simply as a "sink") is any of a device (e.g., a computer), part of a device, or software that receives data.

A "data source" (referred to herein simply as a "source") is any of a device (e.g., a computer), part of a device, or software that originates data.

A "network node" (also referred to simply as a "node") is a junction or connection point in a communications network. Examples of network nodes include, but are not limited to, a terminal, a computer, and a network switch. A "server" network node is a host computer on a network that responds to requests for information or service. A "client network node" is a computer on a network that requests information or service from a server.

A Uniform Resource Identifier (URI) is a string of characters that identifies a network resource.

A "network resource" is anything that can be identified by a uniform resource identifier (URI) and accessed over a network, including an electronic document, an image, a source of information, a service, operators and operands of a mathematical equation, classes, properties, numeric values, and a collection of other resources.

A "network connection" is a link between two communicating network nodes. A "connection handle" is a pointer or identifier (e.g., a uniform resource identifier (URI)) that can be used to establish a network connection with a network resource. A "network communication" can include any type of information (e.g., text, voice, audio, video, electronic mail message, data file, motion data stream, and data packet) that is transmitted or otherwise conveyed from one network node to another network node over a network connection.

Synchronous conferencing refers to communications in which communicants participate at the same time. Synchronous conferencing encompasses all types of networked collaboration technologies, including text chat, audio conferencing, video conferencing, file sharing, and file sharing technologies.

A "communicant interaction" is any type of direct or indirect action or influence between a communicant and another network entity, which may include for example another communicant, a virtual area, or a network service. Examples of types of communicant communications include communicants communicating with each other in realtime, a communicant entering a virtual area, and a communicant requesting access to a resource from a network service.

"Presence" refers to the ability and willingness of a networked entity (e.g., a communicant, service, or device) to communicate, where such willingness affects the ability to detect and obtain information about the state of the entity on a network and the ability to connect to the entity.

A "realtime data stream" is data that is structured and processed in a continuous flow and is designed to be received with no delay or only imperceptible delay. Realtime data streams include digital representations of voice, video, user movements, facial expressions and other physical phenomena, as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), screen shares, and file transfers.

A "virtual area" (also referred to as an "area" or a "place") is a representation of a computer-managed space or scene. Virtual areas typically are one-dimensional, two-dimensional, or three-dimensional representations; although in some examples a virtual area may correspond to a single point. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization. A virtual area typically refers to an instance of a virtual area schema, where the schema defines the structure and contents of a virtual area in terms of variables and the instance defines the structure and contents of a virtual area in terms of values that have been resolved from a particular context.

A "virtual area application" (also referred to as a "virtual area specification") is a description of a virtual area that is used in creating a virtual environment. The virtual area application typically includes definitions of geometry, physics, and realtime switching rules that are associated with one or more zones of the virtual area.

A "virtual environment" is a representation of a computer-managed space that includes at least one virtual area and supports realtime communications between communicants.

A "zone" is a region of a virtual area that is associated with at least one switching rule or governance rule. A "switching rule" is an instruction that specifies a connection or disconnection of one or more realtime data sources and one or more realtime data sinks subject to one or more conditions precedent. A switching rule controls switching (e.g., routing, connecting, and disconnecting) of realtime data streams between network nodes communicating in the context of a virtual area. A governance rule controls a communicant's access to a resource (e.g., an area, a region of an area, or the contents of that area or region), the scope of that access, and follow-on consequences of that access (e.g., a requirement that audit records relating to that access must be recorded). A "renderable zone" is a zone that is associated with a respective visualization.

A "position" in a virtual area refers to a location of a point or an area or a volume in the virtual area. A point typically is represented by a single set of one-dimensional, two-dimensional, or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

A "spatial state" is an attribute that describes where a user has presence in a virtual area. The spatial state attribute typically has a respective value (e.g., a zone_ID value) for each of the zones in which the user has presence.

A "communication state" is an attribute that describes a state of a respective communication channel over which a respective one of the communicants is configured to communicate.

As used herein, the term "includes" means includes but not limited to, the term "including" means including but not limited to. The term "based on" means based at least in part on.

II. Realtime Communications and Network Browsing Client

The examples that are described herein include a realtime communications and web browsing client application with a graphical user interface that provides a single point of control for a user's realtime communications and network browsing experiences. Examples of the client application enable realtime communications in persistent virtual area locations that contextualize communicant interactions and index persistent records of those interactions. In some examples, the client application also integrates user preferences, profile information, navigation records, and contact information such that this information can be used across the realtime communications and browsing interaction modalities. This feature avoids the need for the user to keep separate sets of user information for each mode of interaction.

FIG. 1 shows an example of a network communications environment 10 that includes a client network node 12 (Client Node A), one or more other client network nodes 14, a web server network node 15, and a virtual environment creator 18 that are interconnected by a network 20.

The network 20 may include any of a local area network (LAN), a metropolitan area network (MAN), and a wide area network (WAN) (e.g., the internet). The network 20 typically includes a number of different computing platforms and transport facilities that support the transmission of a wide variety of different media types (e.g., text, voice, audio, and video) between network nodes.

The first client network node 12 includes a computer-readable medium (or "memory") 22, a processor 24, and input/output (I/O) hardware 26 (including a display). The processor 24 executes a communications application 28 (also referred to herein as the "client application") that is stored in the memory 22. Each of the other client network nodes 14 typically is configured in substantially the same general way as the client network node 12, with a memory storing a communications application, a processor, and input/output (I/O) hardware (including a display).

Each of the network nodes 12, 14 has a respective set of one or more sources and a respective set of one or more sinks. Each source is a device or component that originates data of a particular data stream content type and each sink is a device or component that receives data of a particular data stream content type. A source and a sink of the same data stream content type are referred to herein as being "complementary." Examples of sources include an audio source (e.g., an audio capture device, such as a microphone), a video source (e.g., a video capture device, such as a video camera), a chat source (e.g., a text capture device, such as a keyboard), a motion data source (e.g., a pointing device, such as a computer mouse), and other sources (e.g., file sharing source or a source of a customized real-time data stream). Examples of sinks include an audio sink (e.g., an audio rendering device, such as a speaker or headphones), a video sink (e.g., a video rendering device, such as a display monitor), a chat sink (e.g., a text rendering device, such as a display monitor), a motion data sink (e.g., a movement rendering device, such as a display monitor), and other sinks (e.g., a printer for printing shared files, a device for rendering real-time data streams different from those already described, or software that processes real-time streams for analysis or customized display).

Each source has an active state in which the source is available for originating data and an inactive state in which the source is not available for originating data. Likewise, each sink has an active state in which the sink is available for receiving data and an inactive state in which the sink is not available for receiving data. The communicants operating the client nodes 12, 14 typically can control the states of the sources and sinks via controls provided by the communications applications 28. For example, in some examples, the communications applications 28 provide user controls for turning on/off the local microphones and the local speakers (e.g., headsets) on the client network nodes 12, 14.

The web server 15 delivers network resources in response to requests from browser services (or functions) executing on the client network nodes 12, 14. The information resources commonly are hypertext documents (e.g., HyperText Markup Language (HTML) documents), which may reference, for example, images, style sheets, and scripts (e.g., JavaScripts), and streaming data (e.g., streaming audio data, streaming video data, other streaming information, such as realtime stock quotes and realtime alerts and other event information). The information resources typically are delivered in accordance with the hypertext transfer protocol (HTTP).

The virtual environment creator 18 includes at least one server network node 40 that provides a network infrastructure service environment 42 and hosts one or more server applications 44. Communicants respectively operating from the client nodes 12, 14 connect to the server applications 44 through the communications applications 28. One or more of the server applications 44 typically are synchronous conferencing server applications that support one or more types of realtime communications between the client nodes 12, 14 (e.g., instant messaging, which includes text chat, audio conferencing, video conferencing, screen sharing, and file sharing). The network infrastructure service environment 42 typically maintains a relationship database 46 that contains records 48 of interactions between communicants and social network profiles 50 that are associated with respective communicants. Each interaction record 48 describes the context of an interaction between a pair of communicants. Each social network profile 50 typically includes: identity characteristics (e.g., name, age, gender, and geographic location information such as postal mailing address) that describe a respective communicant or a persona that is assumed by the communicant; explicit relationship information that is declared by the communicant; and relationship information that is inferred from the communicant's interactions in the network communication environment 10.

The communications applications 28 respectively operating on the client nodes 12, 14 typically include software and hardware resources which, together with administrative policies, user preferences (including preferences regarding the exportation of the user's presence and the connection of the user to server application and other users), and other settings, define a local configuration that influences the administration of realtime connections with other network nodes.

The network connections between network nodes may be arranged in a variety of different stream handling topologies, including a peer-to-peer architecture, a server-mediated architecture, and hybrid architectures that combine aspects of peer-to-peer and server-mediated architectures. Examples of topologies of these types are described in U.S. patent application Ser. No. 11/923,629, filed Oct. 24, 2007, U.S. patent application Ser. No. 11/923,634, filed Oct. 24, 2007, and U.S. patent application Ser. No. 12/630,973, filed Dec. 4, 2009.

In some examples, the one or more server network nodes 40 remotely manage client communication sessions and remotely configure audio and graphic rendering engines on the client network nodes 12, 14, as well as switching of data streams by sending instructions (also referred to as definitions) from the remotely hosted server applications 44 to the client network nodes in accordance with the stream transport protocol described in U.S. patent application Ser. No. 12/825,512, filed Jun. 29, 2010, and U.S. patent application Ser. No. 12/630,973, filed Dec. 4, 2009. In some of these examples, the server node 40 sends to each of the client nodes 12, 14 provisioning messages that configure the client nodes 12, 14 to interconnect respective data streams between active ones of their complementary sources and sinks in accordance with switching rules specified in the server applications 44.

The communications applications 28, the one or more server applications 44, and the network infrastructure service environment 42 together provide a platform (referred to herein as "the platform") for managing communications between communicants operating the network nodes 12, 14. The platform tracks communicants' realtime availabilities and activities across the different communication contexts that are defined by the server applications 44. This information is presented to the communicants in the form of realtime visualizations that enable the communicants to make more informed network interaction decisions (e.g., when to interact with a contact) and encourage the communicants to initiate interactions with other communicants and to join contexts (e.g., an ongoing conversation between communicants) of which the communicants otherwise would not have been aware. In some examples, the realtime visualization includes visual cues indicating the presence and activities of the communicants in the contexts of the server applications 44. The presentation of these visual cues typically depends on one or more of governance rules set by the server applications, administrative policies, and user preferences (including preferences regarding the exportation of the user's presence and the connection of the user to areas and other users). In addition, the level of detail and interactivity of the user may depend on whether or not the user is a member of and/or has a presence in a particular server application or in a particular zone of a server application.

Figure 2:
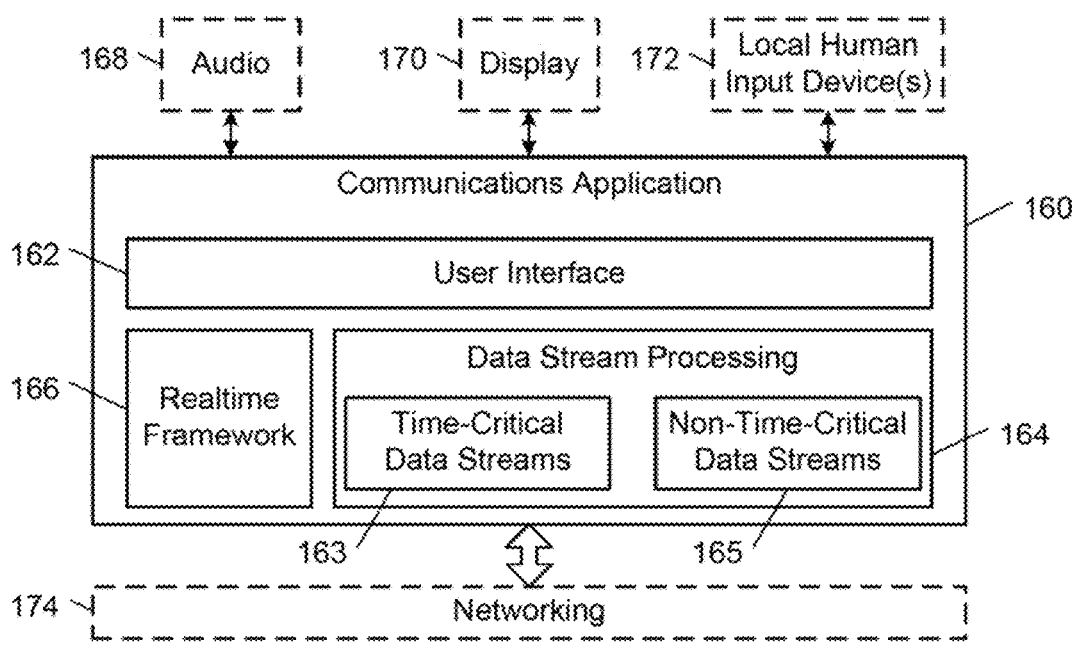
FIG. 2 is a block diagram of an example of a client application.

FIG. 2 shows an example 160 of the client communications application 28 that interfaces with audio 168, display 170, input 172, and networking 174 components of the client network node 12 in the process of connecting the user to the other communicants 14 and network resources. The client communications application 160 includes a user interface 162, data stream processing 164, and a realtime framework 166.

The user interface 162 generates a graphical user interface that provides a single point of control for a user's realtime communications and web browsing experiences.

The data stream processing 164 routes and processes data streams received by the client application 28 in connection with the user's realtime communications and web browsing activities. These data streams include time-critical data streams 163 and non-time-critical data streams 165.

Time-critical realtime data streams are data streams that typically should be delivered in a predictable and timely manner (e.g., an even rate) in order to avoid significant degradation of the user's experience. Audio and realtime graphics (e.g., video) are examples of such time-critical realtime data streams. These data streams typically are delivered over an unreliable transport protocol (e.g., UDP) in order to reduce latency, which is a more importance factor because, in the case of time-critical realtime data streams, dropped packets typically have a much smaller impact on user experience than unpredictable or untimely delivery.

Non-time-critical data streams are data streams that typically do not have to be delivered in a predictable and timely in order to avoid significant degradation of the user's experience. Non-streaming web content, text chat, file sharing data, and screen share data are examples of such non-time-critical realtime data streams. These streams typically are delivered over a reliable transport protocol (e.g., Transport Control Protocol (TCP), and the reliable STRAW protocol described in U.S. patent application Ser. No. 12/825,512, filed Jun. 29, 2010) because the integrity of the content has a much greater impact on the user's experience than predictability and timeliness of delivery.

Examples of the data stream processing 164 include audio and video stream processing that mixes and applies one or more effects to realtime audio and graphic data streams. Depending on the content type, the output of the data stream processing 164 may be stored on a computer-readable medium or converted into a human-perceptible output by the I/O hardware 26 operating on the client network nodes 12, 14. For example, audio output signals are converted into audible sounds by audio hardware (e.g., a sound card and speakers) and graphic output signals are converted into visible images by graphic hardware (e.g., a video card and a display). In some embodiments, the output that is produced by the data stream processing 164 is processed by one or more downstream software components that in turn produce an output that either may be stored on a computer-readable medium or converted into a human-perceptible output.

As explained in detail below, the realtime framework 166 manages the operation of the client network node based on a performance target in accordance with a process for improving realtime performance of the client network node.

Figure 3:
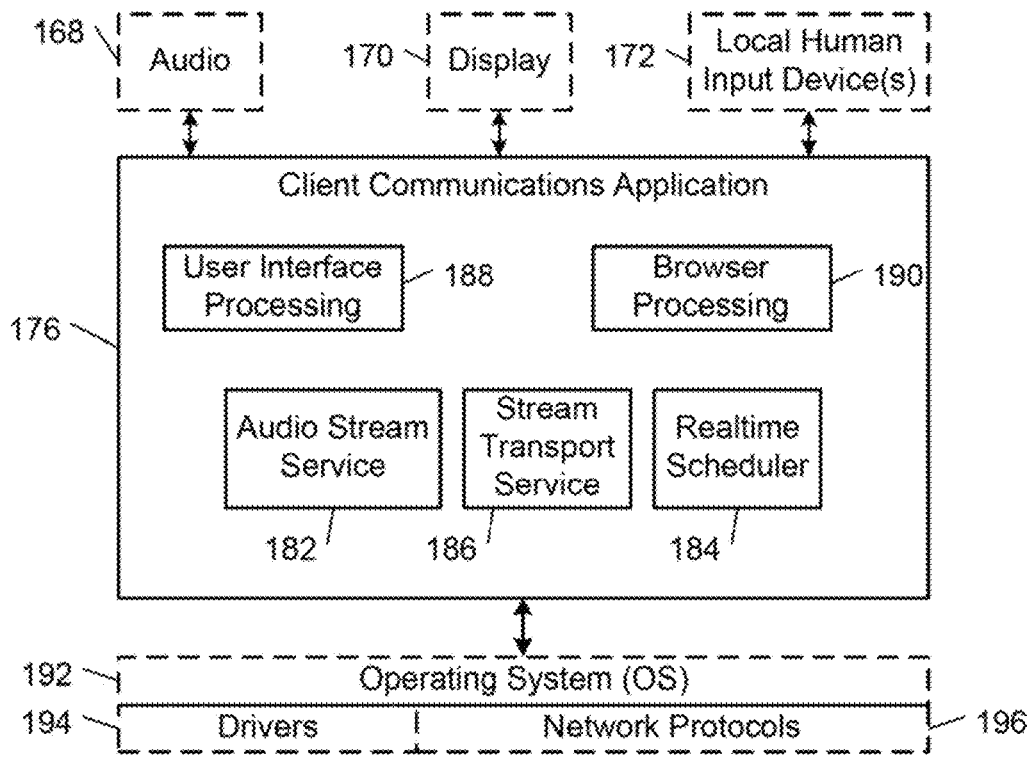
FIG. 3 is a block diagram of an example of a client application.

FIG. 3 shows an example 176 of the client communications application 160 that includes an audio stream service 182 that processes and mixes audio data streams, a realtime scheduler 184 that manages the rendering of realtime data streams, and a stream transport service 186 that manages sessions between the client network node and other network nodes. In some embodiments, the audio stream service 182 and the realtime scheduler 184 are implemented by the corresponding components of the realtime kernel described in U.S. patent application Ser. No. 12/630,973, filed Dec. 4, 2009, and the stream transport service 186 is implemented by the stream transport service described in U.S. patent application Ser. No. 12/825,512, filed Jun. 29, 2010.

The client communications application 160 also includes a user interface processing module 188 and a browser processing module 190. The user interface processing module generates on the display 170 a graphical user interface that interfaces the user to the realtime communications and web browsing functionalities of the client application 176. The browser processing module 190 provides a set of web browsing functions, including browser functions, document viewing functions, and data downloading functions.

The client communications application 160 interfaces with resources that are available on the client network node, including an operating system 192, device drivers 194, and network protocols 196.

The operating system 192 hosts software applications by providing the base operating system services for creating a run-time execution environment on the client network node. Among the exemplary types of services that typically are provided by the operating system are resource management, file management, security, authentication, verification, notification, and user interfaces (e.g., windowing, menus, dialogs, etc.).

The network protocols 148 control or enable the connection, communication, and transfer of data between the computer system 120 and other network nodes. Exemplary types of network protocols include the Transmission Control Protocol/Internet Protocol (TCP/IP), the User Datagram Protocol/Internet Protocol (UDP/IP), the realtime Transport Protocol (RTP), and the Session Initiation Protocol (SIP).

The device drivers 146 typically are implemented by software applications that enable other software applications (e.g., user-mode software applications, including the client application, and the operating system) to interact with hardware devices that are connected to the computer system 120. A device driver typically provides an application programming interface (API) for functions that can be invoked by calls made by software processes in order to translate commands and data that are transferred between the software processes and the hardware device.

Figure 4:
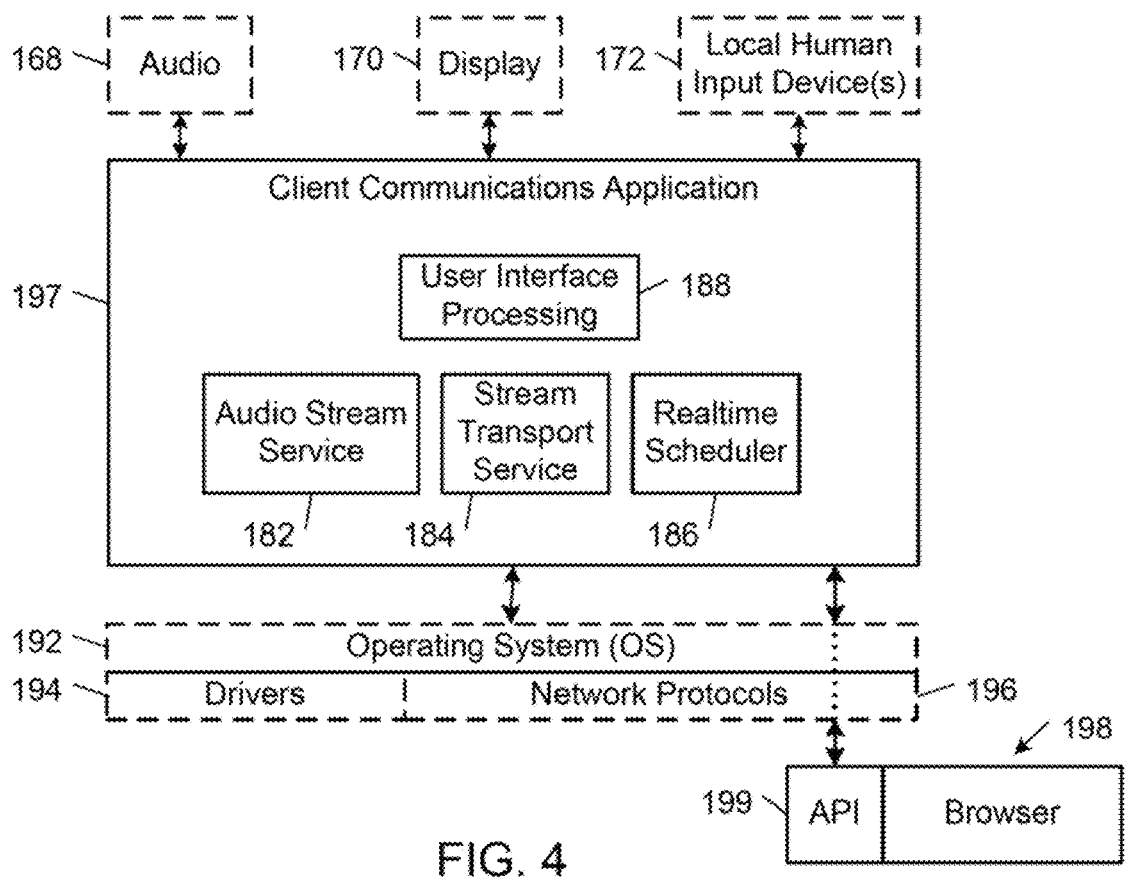
FIG. 4 is a block diagram of an example of a client application.

FIG. 4 shows an example 197 of the client communications application 160 that corresponds to the client application example 176 (FIG. 3), except that instead of being integrated into the client application the browser processing functionality is implemented by a separate browser component 198 that exposes an API 199 through which the application processing components 200 may call methods that are available from the browser component 198, including browsing methods, document viewing methods, and data downloading methods. In some examples, the browser component 198 is a browser object that encapsulates the functionality of a browser (e.g., the Internet Explorer™ browser, the Chrome™ browser, and the Safari™ browser) and exposes its functionality through the API 199. In this example, the application processing component 200 uses the API 199 to control and interact with the browser object. In these examples, the application processing component 200 defines a container for the browser object that allows the browser object to receive user input from and render hypertext data directly in the graphical user interface.

Figure 5:
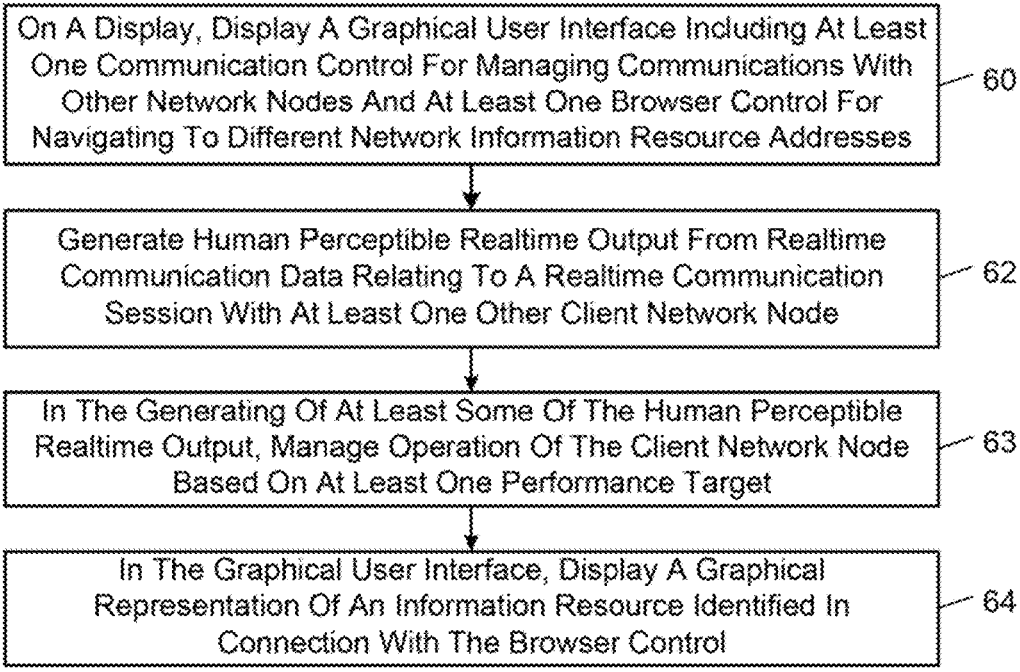
FIG. 5 is a flow diagram of an example of a method performed by an example of a client application executing on a client network node.

FIG. 5 shows an example of a method by which the client communications application 28 executing on a client network node 12, 14 provides a single point of control for a user's realtime communications and network browsing activities.

On a display, the client communications application 28 displays a graphical user interface comprising at least one communication control for managing communications with other network nodes and at least one browser control for navigating to different network resource addresses (FIG. 5, block 60). The client communications application 28, generates the graphical user interface in a window that is controlled (or owned) by the client communications application 28. The client communications application 28 generates human perceptible realtime output from realtime communication data relating to a realtime communication session with at least one other client network node (FIG. 5, block 62). In some examples, the human perceptible realtime output includes graphical realtime output, and the process of generating the human perceptible realtime output includes displaying the graphical realtime output in the graphical user interface. In generating at least some of the human perceptible realtime output, the client communications application 28 manages operation of the client network node 12 based on at least one performance target. In the graphical user interface, the client communications application 28 displays a graphical representation of a network resource identified in connection with the web browser control (FIG. 5, block 64).

The communication and browsing controls typically are responsive to user selections that are made using a local human input device (HID) (e.g., a computer mouse, a touch pad, a touch screen display, a keyboard, and a video game controller). Examples of communication controls include a control for toggling on and off the local speakers, a control for toggling on and off the local microphone, a control for toggling on and off the local video camera, a control to initiate a chat with a selected communicant, and a control to invite another communicant to participate in a communication session. Examples of browsing controls include a control for navigating to a specified uniform resource identifier (URI) of a network resource, a control for traversing a navigation stack of URIs, and a control for reloading a graphic representation of the information resource in the graphical user interface. Examples of controls include command buttons, command items in a context menu, and command items in a toolbar dropdown list.

Examples of graphical realtime output include presence information, text chat, video conferencing, visual cues showing current communication states of the communicants who are present in a particular server application 44, and realtime motion data streams describing movement of communicant avatars. In some examples, the graphical realtime output is displayed in a communications panel of the graphical user interface, and the graphical web content is displayed in a separate panel of the graphical user interface.

The client communications application 28 may manage the operation of the client network node in different ways, including managing the load on resources of the client network node 12, and managing the relative amounts of available network resources that are allocated between time-critical data streams and non-time-critical data streams. In some examples, the realtime framework 166 of the client communications application 28 modifies the processing of one or more data streams (which may be time-critical data streams, non-time-critical data streams, or both) to reduce the current load on one or more of the resources (e.g., computational, memory, and networking resources) of the client network node 12 and thereby increase the likelihood that the performance target is met. In some of these examples, the performance target includes a time-based threshold on the production of a resultant data stream (e.g., an audio stream or a video stream) that is rendered by the client network node 12 to produce the human perceptible realtime output. In other examples, the client communications application 28 manages the operation of the client network node by specifying one or more resource requirements. For example, if the operating system of the client network node is a realtime operation system, the client communications application 28 may specify a quality of service level for one or more data stream content types in terms of respective ranges for delay, jitter, and packet loss rate.

Figure 6:
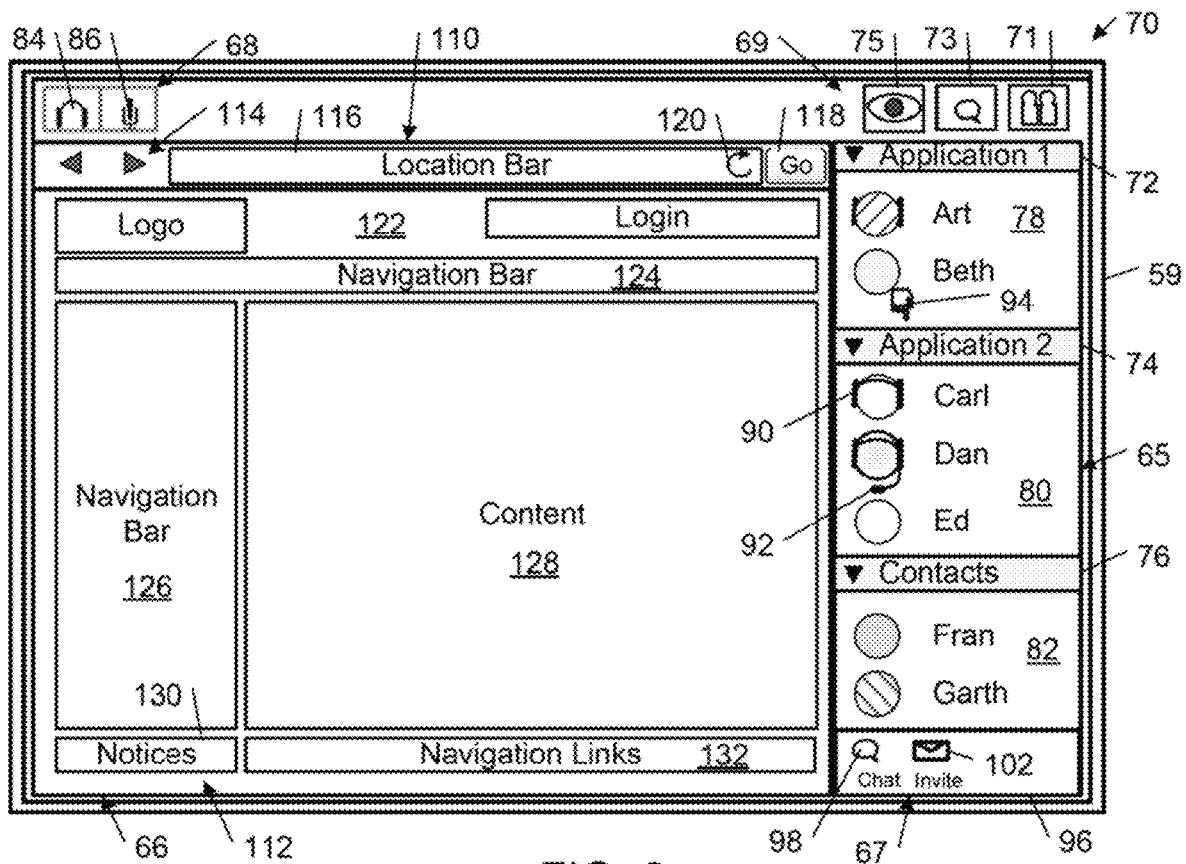
FIG. 6 is a diagrammatic view of an example of a graphical user interface.

FIG. 6 shows an exemplary graphical user interface 70 that is generated by an example of the client communications application 28 in a window 59 on a display of the client network node from which a user of the client application ("Art" in this example) is operating. The graphical user interface 70 includes a people panel 65, a viewer panel 66, a people interaction toolbar 67, an audio interaction toolbar 68, and a set of panel view controls 69.

The people interaction toolbar 67 includes a Chat button 98 and an Invite button 102. Selection of the Chat button 98 opens a chat panel 140 (see FIG. 4) that enables Art to initiate a chat with other communicants who are present in the area application where Art is present (i.e., Zone 1 in the illustrated example). Selection of the Invite button 102 opens an Invite window that enables Art to invite one or more communicants to a selected virtual area location (e.g., an area application or zone within that area application). Additional details regarding embodiments of the methods and functions invoked by the Chat button 98 and the Invite button 102 are described in U.S. patent application Ser. No. 12/354,709, filed Jan. 15, 2009, and U.S. Provisional Patent Application No. 61/373,914, filed Aug. 16, 2010.

The audio interaction toolbar 68 includes a headphone control 84 that enables Art to toggle on and off the local speakers of the client network node, and a microphone control 86 that enables Art to toggle on and off the local microphone of the client network node.

The panel view controls 69 include a people panel button 71 for opening and closing the people panel 65, a chat panel button 73 for opening and closing a chat panel (see FIG. 7), and a viewer panel button 75 for opening and closing the viewer panel 66.

The people panel 65 depicts the realtime availabilities and activities of some or all of Art's contacts across different communication contexts. In FIG. 6, the people panel 65 shows Art's communicants segmented into two server application groups 72, 74 and a contacts group 76. The server application groups 72, 74 correspond to each of the server applications 44 of which Art is a member with respect to which at least one of Art and Art's contacts is present. The contacts group 76 contains all or a selected portion of Art's contacts that are not represented in any of the server application groups. The first server application group 72 of communicants is contained within a section 78 (labeled with a header bar entitled "Application 1") that identifies all the communicants who have a presence in the server application "Application 1". The second server application group 74 of communicants is contained within a section 80 (labeled with a header bar entitled "Application 2") that identifies all the communicants who have a presence in the server application "Application 2". The contacts group 76 of communicants is contained within a section 82 (labeled with a header bar entitled "Contacts") that identifies all of Art's contacts who are not shown in any of the first and second server application groups 72, 74 (i.e., they either are not members of or not present in any of Application 1 and Application 2).

In the example shown in FIG. 6, the server application sections 78, 80 contain graphical representations (avatars) of the communicants (including at least one of Art or Art's contacts) who currently have presence in the respective server applications 44, and the contacts section 82 contains graphical representations (avatars) of some or all of Art's contacts who currently are not present in or not members of any of Application 1 and Application 2. In the illustrated example: Art and Beth are members of server Application 1; Art, Carl, Dan, and Ed are members of server Application 2; and Fran and Garth are not members of server Application 1 nor server Application 2.

Each communicant is represented graphically by a respective circular sprite that is labeled with a respective user name of the communicant (i.e., "Art," "Beth," "Carl," "Dan," "Ed," "Fran," and "Garth"). Each sprite also may be associated with a respective status line that includes additional information about the communicant. In some embodiments, each status line can include one or more of the following information: location of presence (e.g., a server application or a zone of that sever application); availability (e.g., busy, idle); a status message (e.g., "Out of the office next Wednesday"); and the name of the client node from which the communicant is operating (e.g., "workstation 1" or "mobile phone"). In some embodiments, the ordering of the spatial positions (e.g., from top to bottom) of the communicant avatars in each of the sections 78, 80, 82 is alphabetical by user name. In other embodiments, the spatial positions of the communicant avatars in each of the server application sections 78, 80 are ordered in accordance with the temporal ordering of the communicants in terms of the times when the communicants established their respective presences with the server applications. The spatial positions of the communicant avatars in the contacts section 82 may be sorted alphabetically by user name, according to frequency of contact, according to recentness of contact, or according to other sorting or filtering criteria.

The activities of the communicants in the contexts of the server applications 44 may be inferred from the activities on the communication channels over which the respective communicants are configured to communicate. The activities on the communication channels are shown in the graphical user interface 70 by visual cues that are depicted in association with the graphical representations of the communicants in the sections 78, 80, 82. For example, the "on" or "off" state of a communicant's local speaker channel is depicted by the presence or absence of a headphones graphic 90 on the communicant's sprite. When the speakers of the communicant who is represented by the sprite are on, the headphones graphic 90 is present (see sprites Art, Carl, and Dan) and, when the communicant's speakers are off, the headphones graphic 90 is absent (see sprites Beth and Ed). The "on" or "off" state of the communicant's microphone is depicted by the presence or absence of a microphone graphic 92 on the communicant's sprite. When the communicant's microphone is on, the microphone graphic 92 is present (see sprite Dan); and, when the communicant's microphone is off, the microphone graphic 92 is absent (see sprites Art, Beth, Carl, and Ed). The headphones graphic 90 and the microphone graphic 92 provide visual cues of the activity states of the communicant's sound playback and microphone devices. In addition, the current activity state of a communicant's microphone channel is indicated by a dynamic visualization that lightens and darkens the communicant's avatar in realtime to reflect the presence or absence of audio data on the microphone channel. Thus, whether or not their local speakers are turned on, communicants can determine when another communicant is speaking by the "blinking" of the coloration of that communicant's avatar. The activity state of a communicant's text chat channel is depicted by the presence or absence of the hand graphic 94 adjacent the communicant's sprite (see sprite Beth). Thus, when a communicant is transmitting text chat data to another network node the hand graphic 94 is present, and when a communicant is not transmitting text chat data the hand graphic 94 is not present. In some embodiments, text chat data is transmitted only when keyboard keys are depressed, in which case the visualization of the communicant's text channel appears as a flashing on and off of the hand graphic 94.

In the example shown in FIG. 6, members of a server application are able to receive the visual cues of the communicant activities occurring in the context of that server application whether or not the member is present. Thus, the graphical user interface 70 that is presented to Art shows visual cues indicating the communication channel states of the communicants present in Application 1 (where Art is present) and the communication channel activities of the communicants present in Application 2 (where Art is not present).

Additional details regarding embodiments of the people panel 65 are described in U.S. Provisional Patent Application No. 61/373,914, filed Aug. 16, 2010, and U.S. patent application Ser. No. 12/354,709, filed Jan. 15, 2009.

The viewer panel 66 includes a navigation area 110 and a display area 112.

The navigation area 110 includes forward and back buttons 114, a location bar 116, a Go button 118, and a reload button 120. The forward and back buttons 114 enable a user to traverse a navigation stack of uniform resource identifier (URI) addresses (e.g., a linked list of previously visited URLs). The location bar 116 allows a user to specify a URI address of an information resource, and the Go button 118 invokes one or more web browser functions on the client network node to navigate to the specified URI address and render the information resource at the specified URI address in the display area 112. The reload button 120 invokes one or more web browser functions on the client network node to reload the graphic representation of the information resource currently displayed in the display area 112.

The display area 112 contains a rendered depiction of a network resource located at the URI address specified in the navigation area 110. In the example shown in FIG. 6, the viewer panel 66 is in the browser view mode and shows a rendered view of the network resource (a web page in this example) that is located at the URL https://www.sococo-.com/home.php, as indicated in the location bar 116. In the illustrated example, the display area 110 shows a web page that includes a header section 122, a top navigation bar 124, a side navigation bar 126, a contents section 128, a notices section 130, and a navigation links section 132.

Figure 7:
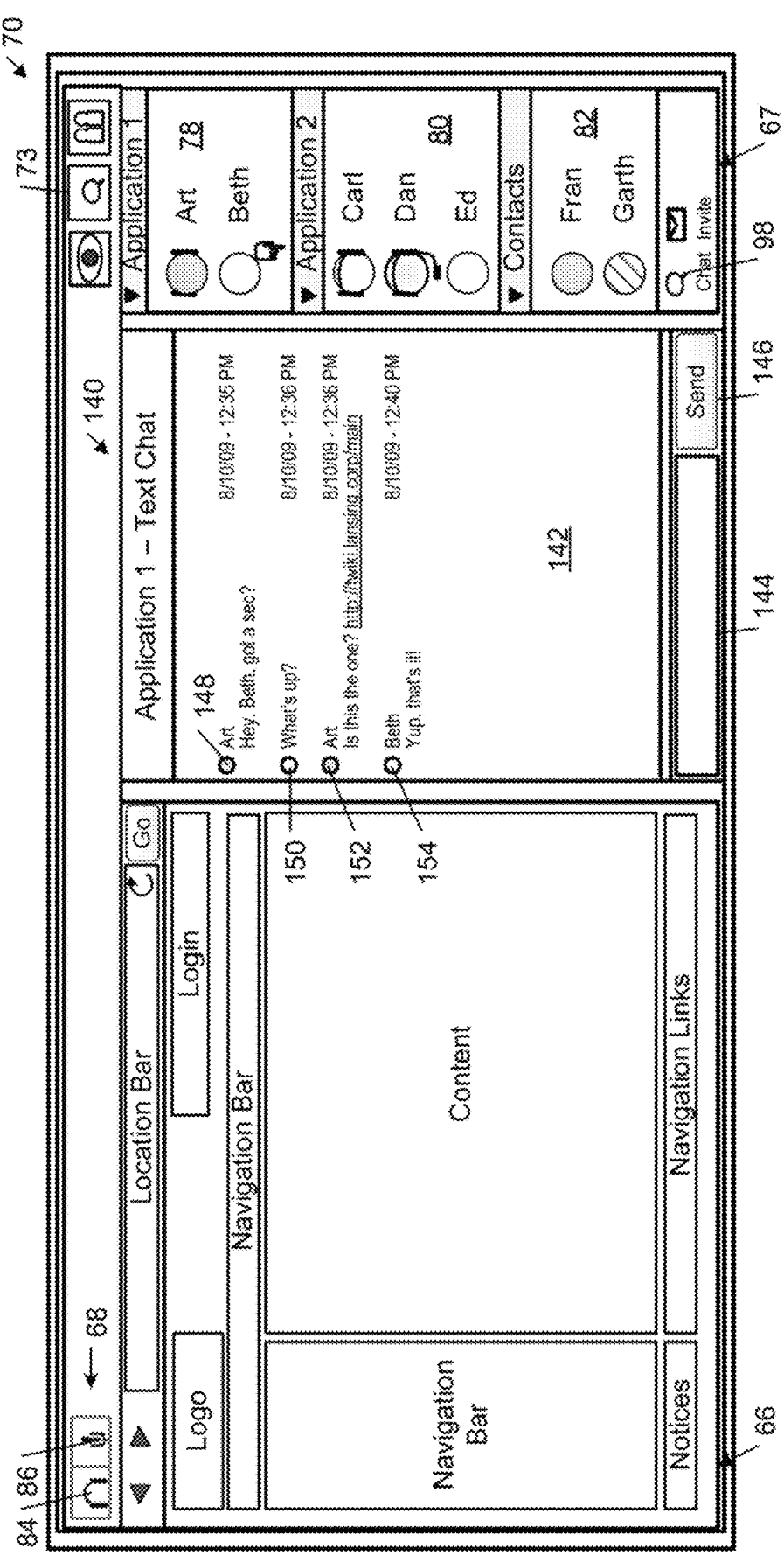
FIG. 7 is a diagrammatic view of an example of a graphical user interface.

FIG. 7 shows an example of the graphical user interface 70 with the chat panel 140 open. Activating the chat panel button 73 or the chat button 98 opens the chat panel 140. When the chat panel button 73 is activated, the chat panel 140 opens to show a chat interface for a persistent virtual chat area for interactions occurring in connection with a respective server application. In the example shown in FIG. 7, Art activated the chat panel button 73 at the time he was present in server Application 1; therefore, the chat panel 140 shown in FIG. 7 contains the persistent virtual chat area for text chat interactions occurring in connection with server Application 1. When the chat button 98 is activated, on the other hand, the chat panel 140 shows a chat interface for a persistent virtual chat area for interactions between Art and the one or more communicants who were selected at the time the chat button 98 was selected.

The chat interface of the chat panel 140 includes a chat log area 142, a text box 144, and a Send button 146. The user may enter text messages in the text box 144 and transmit the text messages to the other communicants who are in the same chat session by selecting the Send button 146. The chat log area 142 displays a log of current and optionally prior events that are associated with Application 1. An exemplary set of events that may be displayed in the chat log area 142 include: text messages that the user has exchanged with other communicants in Application 1; changes in the presence status of communicants in Application 1; changes in the speaker and microphone settings of the communicants in the Application 1; and the status of the props (discussed below), including references to any applications and data files that are shared in connection with the props. In the illustrated embodiments, the events are labeled by the communicant's name followed by content associated with the event (e.g., a text message) or a description of the event.

The chat panel 140 provides a context for organizing the presentation of the events that are displayed in the chat log area 142. For example, in the illustrated embodiment, each of the displayed events is labeled with a respective tag that visually correlates with the appearance of the sprite of the communicant that sourced the displayed event. In particular, each of the events that is sourced by a particular one of the communicants is labeled with a respective icon 148, 150, 152, 154 having a visual appearance (e.g., color-code, or design pattern) that matches the visual appearance of that communicant's sprite. In this example, the color of the icons 148, 152 matches the color of the body of Art's sprite, and the color of the icon 150, 154 matches the color of the body of Beth's sprite.

The realtime framework improves realtime performance of the client network node in a variety of ways, including managing the load on resources of the client network node 12, and managing the relative amounts of available network resources that are allocated between time-critical data streams and non-time-critical data streams.

In some examples, the realtime framework 166 (see, e.g., FIG. 2) manages the load on resources of the client network node 12 by dynamically configuring one or more data stream processing components to reduce the amount of client node resources needed to process data streams (e.g., time-critical data streams, such as audio and video), which may be received from another client network node 14, the server network node 40, or the web server network node 15. By reducing the load on the resources of the client network node 12, the realtime framework 166 increases the likelihood that time-critical realtime data streams (e.g., audio and graphics) are rendered in a timely manner (e.g., at an even frame rate).

In some of these examples, the realtime framework 166 configures stream processing components that process data streams received from other network nodes. In response to stream handling instructions (which may be received from the server node 40 or from a component the client application 28), various services and other components of the realtime framework 166 cooperatively construct and configure directed graphs of processing elements into stream processing components that are used to process data streams.

Figure 8:
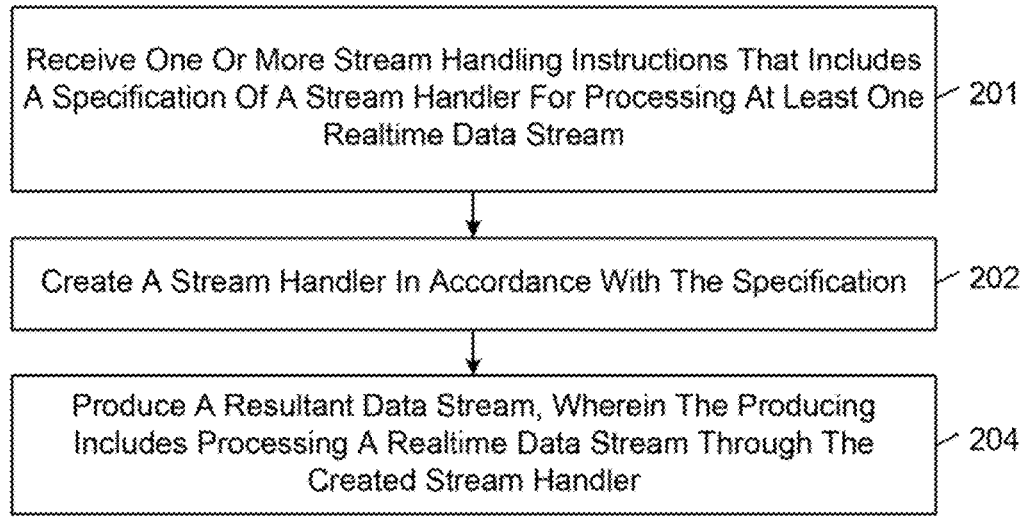
FIG. 8 is a flow diagram of an example of a method that is implemented by an example of a realtime framework.

FIG. 8 shows an embodiment of a stream handling method that is implemented by the realtime framework 166. In this method, the realtime framework 166 receives one or more stream handling instructions that include a specification of a stream handler for processing at least one realtime data stream (FIG. 8, block 201). The realtime framework 166 creates a stream handler in accordance with the stream handler specification (FIG. 8, block 202). The stream handler typically includes a mixing function that is specified in the one or more stream handling instructions. The mixing function is used to mix the realtime data stream with at least one other realtime data stream to produce a mixed realtime data stream. In some examples, the realtime framework 166 creates respective stream handlers of the type described in U.S. patent application Ser. No. 12/630,973, filed Dec. 4, 2009, for receiving and processing the data streams. The realtime framework 166 produces a resultant data stream in a process that includes processing a realtime data stream through the created stream handler (FIG. 8, block 204). In some embodiments, this process involves determining configuration parameter values from realtime state information that is specified in the one or more stream handling instructions, and dynamically configuring the stream handler with the specified configuration parameter values.

Figure 9:
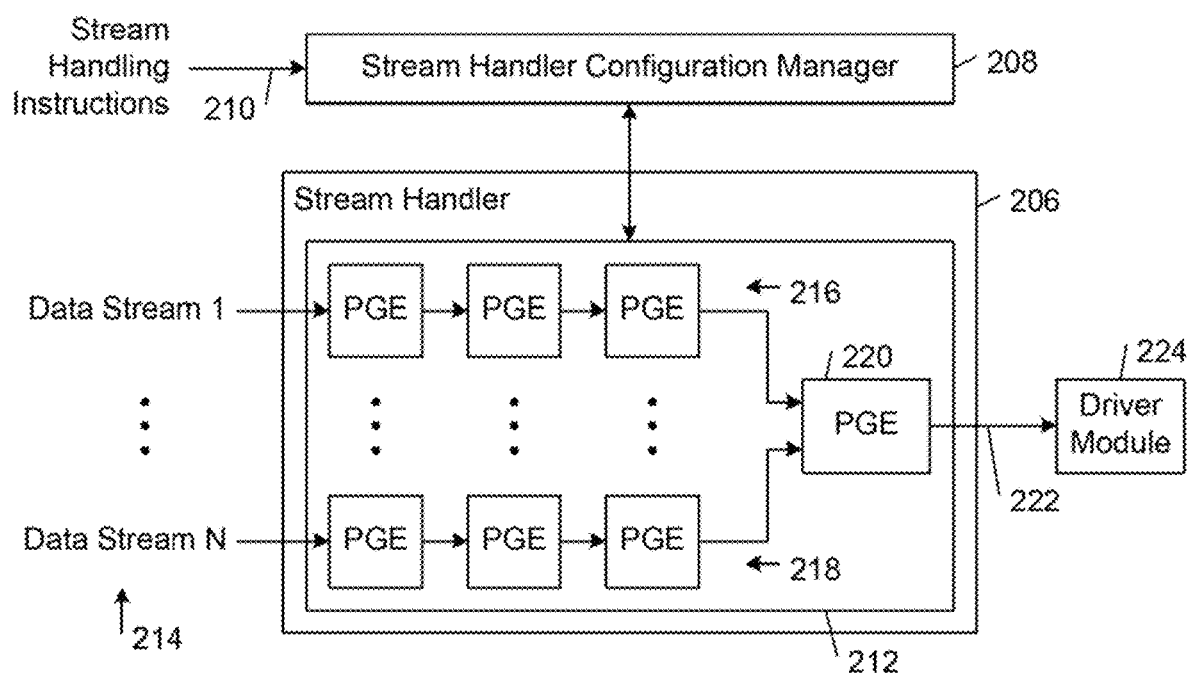
FIG. 9 is a block diagram of an example of a stream handler that is created by an example of a realtime framework.

FIG. 9 shows an embodiment of a stream handler 206 that is created by a stream handler configuration manager 208 (which is component of the realtime framework 166) in accordance with the received stream handling instructions 210. The stream handler configuration manager 208 typically is composed of one or more constituent services and other components of the realtime framework 166. The stream handler configuration manager 208 constructs the stream handler 206 from a set of processing objects (also referred to as processing graph elements or PGEs). Each of the processing objects is a software object that is capable of performing a particular function on a data stream (e.g., a transformation function, a splitting function, and a mixing function). The stream handler configuration manager 208 instantiates the processing objects that are specified in the one or more stream handling instructions and assembles the instantiated processing objects into a directed graph component 212 of the stream handler 206 in accordance with the specification. In some embodiments, the stream handling instructions specify the processing objects with respective unique identifiers and the stream handler configuration manager 208 instantiates the processing objects by issuing calls that include respective ones of the identifiers to a processing object API. The stream handler 206 is configured to process multiple data streams 214 of a particular data type (e.g., audio, video, or motion data types) through respective processing chains 216-218, which are composed of respective ones of the processing objects. The stream handler 206 additionally includes a mixing object 220 (which was specified in the one or more stream handling instructions). In operation, the stream handler 206 executes the mixing object 220 to produce a mixed realtime data stream 222 from a combination of the processed realtime data streams 216-218. In some embodiments, at least one of the instantiated processing objects encapsulates a respective call to a driver module 224, which controls a hardware component of the client network node based at least in part on the resultant data stream 222.

Figure 10:
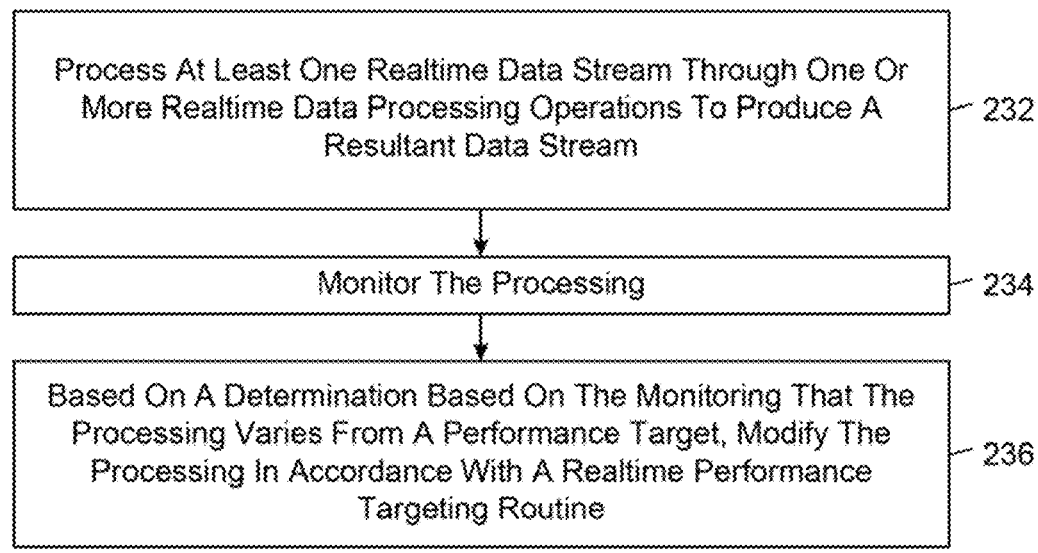
FIG. 10 is a flow diagram of an example of a method that is implemented by an example of a realtime framework.

FIG. 10 shows an example of a method of scheduling data stream processing tasks that is implemented by an example of the realtime framework 166. In this method, the realtime framework 166 processes at least one realtime data stream requested by one or more realtime data processing operations to produce a resultant data stream (FIG. 10, block 232). In some examples, the realtime data stream corresponds to an audio or video data stream produced by a session partner client network node 14. In other examples, the realtime data stream corresponds to an audio or video data file (e.g., a YouTube™ video file) that is streamed from a network resource through the network browser component on the client network node 12. The realtime framework 166 monitors the processing of the at least one realtime data stream (FIG. 10, block 234). In response to a determination that the processing of the at least one realtime data stream varies from a performance target, the realtime framework 166 modifies the processing in accordance with a realtime performance targeting routine (FIG. 10, block 236).

In some embodiments, the realtime framework 166 monitors one or more of the following parameters: the rate at which the resultant data stream is produced; utilization of at least one processor of the local network node; and bandwidth utilization by at least one networking resource of the local network node. In some embodiments, the realtime data stream is packetized into frames and the realtime framework 166 monitors the processing of each of each of the frames during each of successive fixed length intervals that are set in accordance with a local clock, which typically is synchronized with a remote master clock service. Based on the monitoring, the realtime framework 166 determines whether or not the processing of the realtime data stream varies from a performance target. In some embodiments, the performance target includes a time-based threshold on the production of the resultant data stream. For example, in some embodiments, the performance target is a predicate (i.e., condition) on the rate at which frames of the resultant data stream are produced. Exemplary performance targets of this type include a target threshold and a target range.

Figure 11:
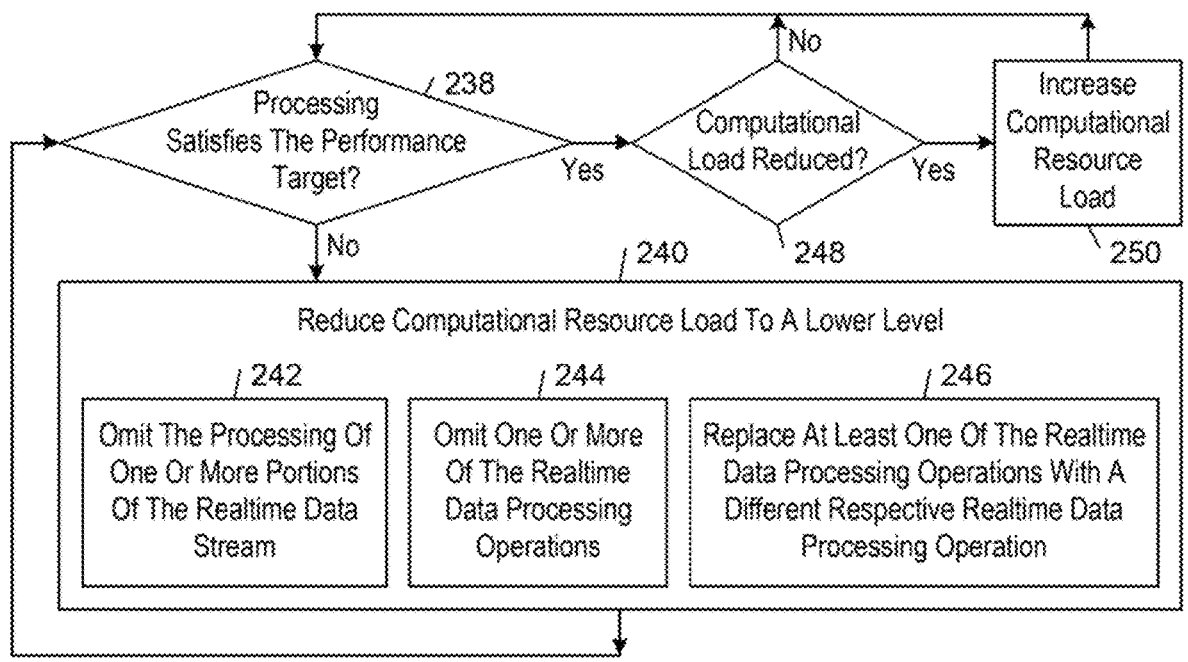
FIG. 11 is a flow diagram of an example of a method that is implemented by an example of a realtime framework based on the monitoring of the processing of the at least one realtime data stream.

FIG. 11 shows an embodiment of a method that is performed by the realtime framework 166 based on the monitoring of the processing of the at least one realtime data stream (FIG. 11, block 234). Based on a determination that the processing of the at least one realtime data stream fails to satisfy the performance target (FIG. 11, block 238), the realtime framework 166 reduces that computational resource load to a lower level (FIG. 11, block 240). Depending on the design of the realtime performance targeting routine, the realtime framework 166 typically reduces the computational resource in one or more of the following ways: the realtime framework 166 may omit the processing of one or more portions of the realtime data stream (FIG. 11, block 242); the realtime framework 166 may omit one or more of the realtime data processing operations (FIG. 11, block 244); and the realtime framework 166 may replace at least one of the realtime data processing operations with a different respective data processing operation (FIG. 11, block 246). In the process of omitting the processing of one or more portions of the realtime data stream (FIG. 11, block 242), the realtime framework 166 typically performs at least one of the following operations: omitting one or more of the data processing operations that are characterized by respective performance values that are outside the performance target; and preferentially omitting one or more of the data processing operations based on priority values that are respectively assigned to ones of the data processing operations.

If the processing of the at least one realtime data stream satisfies the performance target (FIG. 11, block 238) and the computational load has been reduced to a lower level by any of the methods described above (FIG. 11, block 248), the realtime framework 166 increases the computational load from the lower level (FIG. 11, block 250). The realtime framework 166 typically increases the computational resource load by reversing one or more of the operations that were used to reduce the computational resource load in block 240 in accordance with a heuristic. If the processing of the at least one realtime data stream satisfies the performance target (FIG. 11, block 238) and the computational load has not been reduced to a lower level by any of the methods described above (FIG. 11, block 248), the realtime framework 166 maintains the current processing of the realtime data stream.

In some examples, a scheduler service component of the realtime framework 166 manages processing of realtime data streams through stream handlers and the dynamic configuration of the stream handlers.

The scheduler service typically renders audio and realtime video on a frame-by-frame basis. Initially, the streams are started, and then after a delay the realtime scheduler service begins processing the first frame. The delay is calibrated by the combined target latency for each audio and video processing chain. The realtime scheduler service initiates consumption of the previously prepared frame and then processes the next frame on a time Tick that has a fixed period (e.g., 50 milliseconds).

The final rendering objects in each chain are registered with the realtime scheduler service. The objects are derived from a SoFrameRenderer class, which has a method FrameRender(timeFrameMs)

This method prepares one frame for the time indicated, from data sources that are particular to the rendering chain (audio or video). The SoFrameRenderer class includes another method FrameDeliver( )

This method delivers the previously prepared frame to the final destination, which is particular to the rendering chain. SoFrameRenderer objects are not required to be able to buffer more than one complete frame. The realtime scheduler service uses the FrameDeliver method to deliver the previously prepared frame on schedule, and then call FrameRender to prepare the frame for the next interval.

In some embodiments, the realtime scheduler service is configured to call one or more SoFrameRenderer classes, which include audio processors, graphical processors, physical modeling, and scripts. The SoFrameRenderer classes enable the realtime scheduler service to readjust frame processing in response to a determination that the client network node cannot keep up with the target processing level (performance target). In some embodiments, the realtime scheduler implements one or more of the methods described above in connection with FIGS. 10 and 11. In some of these embodiments, the realtime scheduler service measures the rendering time for all frames, and make statistics available through an application programming interface. If the statistics fall out of range (e.g., it takes too long to prepare a frame) then a log event is generated. A heuristic will be triggered, to try to "catch up"; for example by skipping a frame, dropping out-of-range rendering chains (which typically are out-of-range due to a hardware or network error), or by dropping lower-priority rendering chain(s). For the purpose of implementing priority-based scheduling, the SoFrameRenderer class defines the method:

FramePriority( )

This method returns a number, with lower numbers being most important. The heuristic can determine from the chains' latency and priority, which chain(s) should be dropped to produce the most benefit with the least impact on total priority.

In some embodiments, the realtime scheduler service additionally is able to drop stages within a chain. For this purpose, the realtime scheduler service is able to call the method:

Latency=FramePrune(priority), where the realtime scheduler is responsible for "dropping links" that are lower than the indicated priority. The realtime scheduler service can start calling at the maximum priority and count backwards until all frames render within the desired total latency. A combined heuristic of iteratively dropping low-priority chains and pruning the chains themselves typically terminates at some priority level. If the priority level is below a threshold, a log entry can be made and, in some cases, the session is closed.

In some examples, the realtime framework manages the relative amounts of available network resources that are allocated between time-critical data streams and non-time-critical data streams by dynamically influencing the allocation of available bandwidth between time-critical realtime data streams and non-time-critical data streams. The time-critical data streams typically are distinguished from the non-critical data streams by content type. In some examples, realtime audio and video data streams are handled as time-critical data streams, and web browser, text chat, file share data, and screen share data streams are handled as non-time-critical data streams.

In some examples, the realtime framework 166 is able to indirectly increase the availability of the client network node resources (e.g., bandwidth) for delivering time-critical realtime data streams to the user by delaying delivery of non-time-critical data streams (e.g., web browser data, text chat, file sharing data, and screen sharing data). In these examples, during a session with another network node, the realtime framework 166 tracks a bandwidth metric for the connection with the other network node either directly (e.g., by determining current data rates for the connection) or indirectly (e.g., by monitoring the number of dropped packets, which tends to increase when bandwidth is reduced). When the determined bandwidth metric varies from a performance target (e.g., drops below X bits per second, or the number of dropped packets is greater than Y, where X and Y are configurable parameter values), the realtime framework 166 reduces the bandwidth that is effectively available for delivering non-time-critical data streams, increasing the bandwidth that is available for delivering time-critical data streams.

Figure 12:
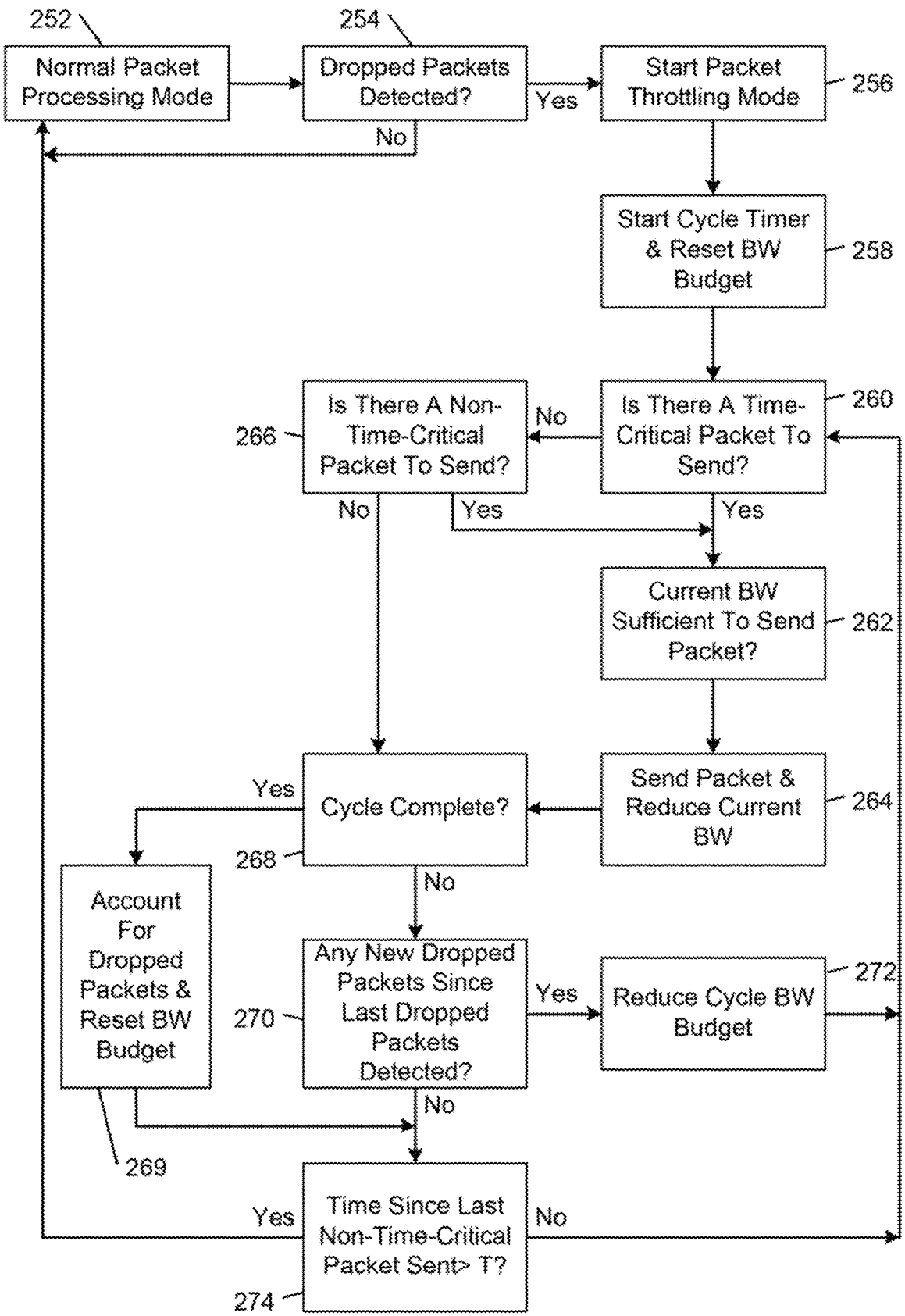
FIG. 12 is a flow diagram of an example of a method that is implemented by an example of a realtime framework.

FIG. 12 shows an example of a method by which the realtime framework 166 manages the relative amounts of available network resources that are allocated between time-critical data streams and non-time-critical data streams.

In accordance with the method of FIG. 12, the realtime framework 166 processes packets in a normal packet processing mode (FIG. 12, block 252). In this mode of operation, a stream transport service of the realtime framework 166 transmits all messages immediately when queued and there is socket buffer room. An example of the stream transport service is described in U.S. patent application Ser. No. 12/825,512, filed Jun. 29, 2010.

The realtime framework 166 determines if any dropped packets have been detected (FIG. 12, block 254). In some examples, dropped packets are detected by comparing the values in the dropped packets count fields in sequential StreamStats messages that are received from a session partner node. Examples of session partner management methods and StreamStats messages are described in U.S. patent application Ser. No. 12/825,512, filed Jun. 29, 2010.

If any dropped packets are detected (FIG. 12, block 254), the realtime framework 166 enters a packet throttling mode of operation (FIG. 12, block 256). In this mode of operation, the realtime framework 166 starts a cycle timer (e.g., a 60 millisecond timer) and resets a bandwidth (BW) budget for the current cycle (e.g., 40 kilobits over the cycle period) for the current cycle. If there is a time-critical packet queued to send to the session partner (FIG. 12, block 260) and the current cycle bandwidth is sufficient to send the packet (FIG. 12, block 262), the realtime framework 166 sends the packet and reduces the current cycle bandwidth budget by the size of the packet sent (FIG. 12, block 264). (In other examples, the current cycle bandwidth budget is not reduced when time-critical packets are sent.) If there are no time-critical packets queued for delivery (FIG. 12, block 260), the realtime framework 166 determines whether or not there is a non-time-critical packet to send to the session partner (FIG. 12, block 266). If there is a non-time-critical packet queued to send to the session partner (FIG. 12, block 266) and the current cycle bandwidth is sufficient to send the packet (FIG. 12, block 262), the realtime framework 166 sends the packet and reduces the current cycle bandwidth budget by the size of the packet sent (FIG. 12, block 264).

If the current cycle is complete (FIG. 12, block 268), the realtime framework 166 accounts for dropped packets and adjusts the budget (FIG. 12, block 269). If the current cycle is not complete, the realtime framework 166 determines if any packets have been dropped since the last dropped packets were detected (FIG. 12, block 270). If there are any newly dropped packets, the realtime framework 166 reduces the cycle bandwidth budget (e.g., by 50%) and repeats the processing in the current cycle (FIG. 12, block 272). If there are no newly dropped packets, the realtime framework determines if the time since the last non-time-critical packet was sent exceeds a time threshold T (e.g., 1 second) (FIG. 12, block 274). If the time since the last non-time-critical packet was sent exceeds the time threshold, the realtime framework 166 resumes processing packets in the normal packet processing mode (FIG. 12, block 252). Otherwise, the realtime framework 166 repeats the processing in the current cycle.

In accordance with the method of FIG. 12, the rate at which packets are offered to the network layer on the client network node is throttled to improve the realtime performance for time-critical data streams. In some cases, the bandwidth throttling by this method may result in higher compression levels or dropped packets for time-critical data streams during times of network congestion. However, by delaying the delivery of non-time-critical data streams (e.g., screen share data, web browser data, and administrative data streams), the bandwidth available for time-critical data streams can be regularized (e.g., evened-out), thereby improving the user's overall experience of those data streams.

Figure 13:
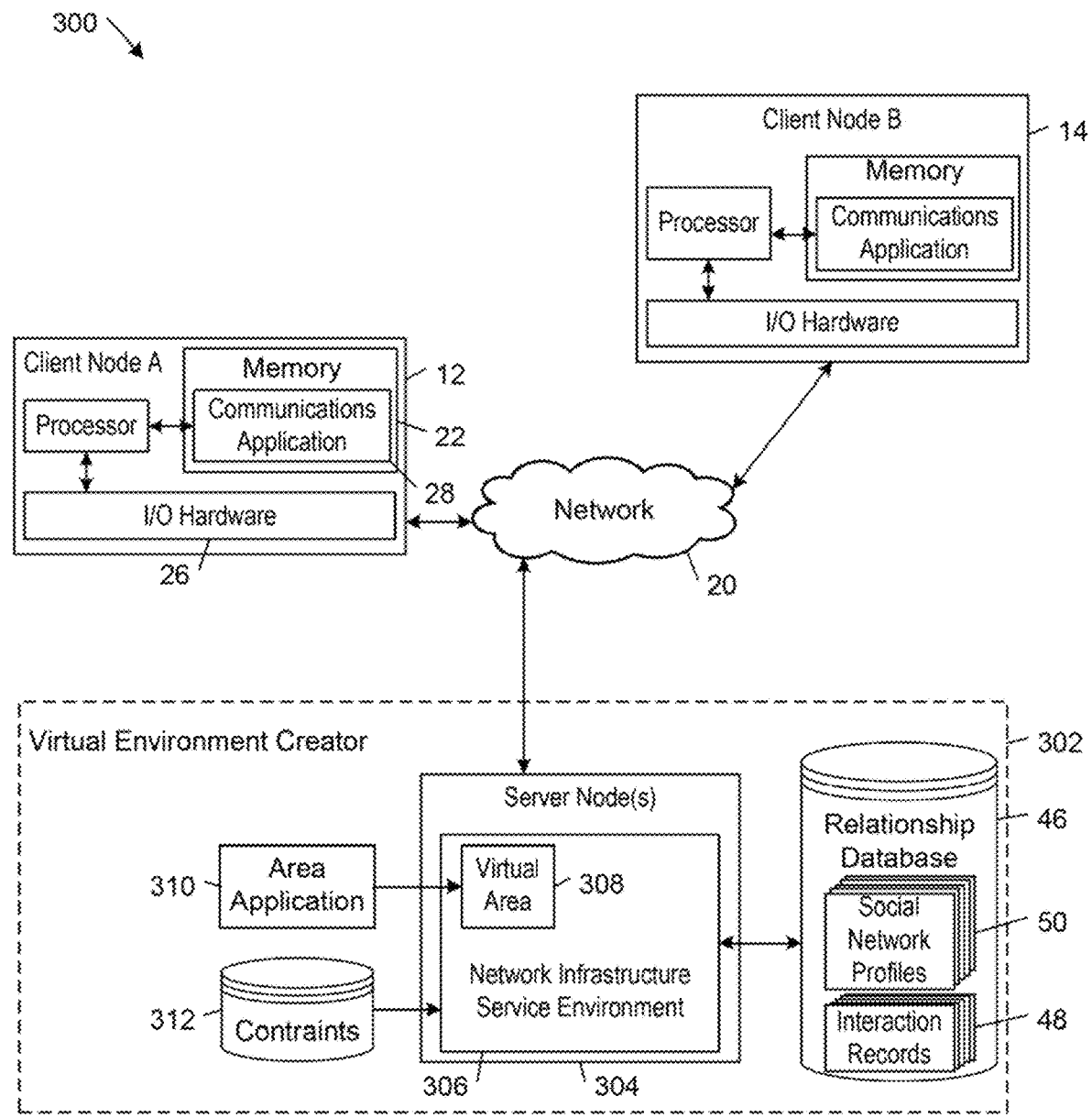
FIG. 13 is a diagrammatic view of an example of a network communications environment that includes a first client network node, another client network node, and one or more server nodes.

FIG. 13 is a diagrammatic view of an embodiment 300 of the network communication environment 10 (see FIG. 1) that includes a network infrastructure service environment 306 that manages sessions of the first and second client nodes 12, 14 in a virtual area 308 in accordance with a virtual area-based server application 310 (referred to herein as "virtual area application"). The virtual area application 310 is hosted by the virtual area 308 and includes a description of the virtual area 308. In some embodiments, the communications applications 28 establish realtime data stream connections between the first and second client network nodes 12, 14 and other network nodes sharing the virtual area 308 based on the positions of the communicants' avatars in the virtual area 308.

The network infrastructure service environment 306 typically includes one or more network infrastructure services that cooperate with the communications applications 28 in the process of establishing and administering network connections between the client nodes 12, 14 and other network nodes. The network infrastructure services may run on one or more network nodes 304. The network infrastructure services typically run on one or more dedicated network nodes (e.g., a server computer or a network device that performs one or more edge services, such as routing and switching). In some embodiments, however, one or more of the network infrastructure services run on at least one of the client network nodes. Among the network infrastructure services that are included in the exemplary embodiment of the network infrastructure service environment 306 are an account service, a security service, an area service, a rendezvous service, an interaction service, and a capabilities engine.

The area service typically administers a virtual area 308 by managing sessions of the first and second client nodes 12, 14 in the virtual area 308 in accordance with the virtual area application 310. The area service remotely configures the communications applications 28 operating on the first and second client network nodes 12, 14 in accordance with the virtual area application 310 subject to a set of constraints 312. The constraints 312 typically include controls on access to the virtual area. The access controls typically are based on one or more of capabilities (where access is granted to communicants or client nodes having proper capabilities or permissions) and an access control list (where access is granted to communicants or client nodes having identities that are on the list).

Examples of the virtual environment creator 302 and the virtual area applications 310 are described in U.S. Provisional Patent Application No. 61/563,088, filed Nov. 23, 2011. Examples of an account service, a security service, an area service, a rendezvous service, and an interaction service are described in U.S. patent application Ser. No. 12/630,973, filed Dec. 4, 2009. Examples of a capabilities engine are described in U.S. Provisional Patent Application No. 61/535,910, filed Sep. 16, 2011.

The communications application 28 and the network infrastructure service environment 306 administer the realtime connections with network nodes in a communication context that is defined by an instance of a virtual area 308. The virtual area instance may correspond to an abstract (non-geometric) virtual space that is defined with respect to abstract coordinates. Alternatively, the virtual area instance may correspond to a visual virtual space that is defined with respect to one-, two- or three-dimensional geometric coordinates that are associated with a particular visualization. Abstract virtual areas may or may not be associated with respective visualizations, whereas visual virtual areas are associated with respective visualizations.

The communications applications 28 operating on the first and second client network nodes 12, 14 present respective views of the virtual area 308 in accordance with data received from the network infrastructure service environment 306 and provide respective interfaces for receiving commands from the communicants and providing a spatial interface that enhances the realtime communications between the communicants. The communicants typically are represented in the virtual area 308 by respective avatars, which typically move about the virtual area 308 in response to commands that are input by the communicants at their respective network nodes. Each communicant's view of the virtual area 308 typically is presented from the perspective of the communicant's avatar, which increases the level of immersion experienced by the communicant. Each communicant typically is able to view any part of the virtual area 308 around his or her avatar, increasing the level of immersion that is experienced by the communicant.

A virtual area typically includes one or more zones that are associated with respective rules that govern the switching of realtime data streams between the network nodes that are represented by the avatars in the virtual area. The switching rules dictate how local connection processes executing on each of the network nodes establishes communications with the other network nodes based on the locations of the communicants' avatars in the zones of the virtual area. A virtual area typically is defined by a specification that includes a description of geometric elements of the virtual area and one or more rules, including switching rules and governance rules. The switching rules govern realtime stream connections between the network nodes. The governance rules control a communicant's access to resources, such as the virtual area itself, regions with the virtual area, and objects within the virtual area. In some embodiments, the geometric elements of the virtual area and the switching rules are described in accordance with the COLLADA Streams Reference specification described in U.S. application Ser. Nos. 11/923,629 and 11/923,634.

The geometric elements of a visual virtual area typically include physical geometry and collision geometry of the virtual area. The physical geometry describes the shape of the virtual area. The physical geometry typically is formed from surfaces of triangles, quadrilaterals, or polygons. Colors and textures are mapped onto the physical geometry to create a more realistic appearance for the virtual area. Lighting effects may be provided, for example, by painting lights onto the visual geometry and modifying the texture, color, or intensity near the lights. The collision geometry describes invisible surfaces that determine the ways in which objects can move in the virtual area. The collision geometry may coincide with the visual geometry, correspond to a simpler approximation of the visual geometry, or relate to application-specific requirements of a virtual area designer.

The switching rules typically include a description of conditions for connecting sources and sinks of realtime data streams in terms of positions in the virtual area. Each rule typically includes attributes that define the realtime data stream type to which the rule applies and the location or locations in the virtual area where the rule applies. In some embodiments, each of the rules optionally may include one or more attributes that specify a required role of the source, a required role of the sink, a priority level of the stream, and a requested stream handling topology. In some embodiments, if there are no explicit switching rules defined for a particular part of the virtual area, one or more implicit or default switching rules may apply to that part of the virtual area. One exemplary default switching rule is a rule that connects every source to every compatible sink within an area, subject to policy rules. Policy rules may apply globally to all connections between the client nodes or only to respective connections with individual client nodes. An example of a policy rule is a proximity policy rule that only allows connections of sources with compatible sinks that are associated with respective objects that are within a prescribed distance (or radius) of each other in the virtual area.

In some embodiments, governance rules are associated with a virtual area to control who has access to the virtual area, who has access to its contents, what is the scope of that access to the contents of the virtual area (e.g., what can a user do with the contents), and what are the follow-on consequences of accessing those contents (e.g., record keeping, such as audit logs, and payment requirements). In some embodiments, an entire virtual area or a zone of the virtual area is associated with a "governance mesh." In some embodiments, a governance mesh is implemented in a way that is analogous to the implementation of the zone mesh described in U.S. application Ser. Nos. 11/923,629 and 11/923,634. A governance mesh enables a software application developer to associate governance rules with a virtual area or a zone of a virtual area. This avoids the need for the creation of individual permissions for every file in a virtual area and avoids the need to deal with the complexity that potentially could arise when there is a need to treat the same document differently depending on the context.

In some embodiments, a virtual area is associated with a governance mesh that associates one or more zones of the virtual area with a digital rights management (DRM) function. The DRM function controls access to one or more of the virtual area or one or more zones within the virtual area or objects within the virtual area. The DRM function is triggered every time a communicant crosses a governance mesh boundary within the virtual area. The DRM function determines whether the triggering action is permitted and, if so, what is the scope of the permitted action, whether payment is needed, and whether audit records need to be generated. In an exemplary implementation of a virtual area, the associated governance mesh is configured such that if a communicant is able to enter the virtual area he or she is able to perform actions on all the documents that are associated with the virtual area, including manipulating the documents, viewing the documents, downloading the documents, deleting the documents, modifying the documents and re-uploading the documents. In this way, the virtual area can become a repository for information that was shared and discussed in the context defined by the virtual area.

Additional details regarding the specification of a virtual area are described in U.S. application Ser. No. 12/418,243 (which was filed on Apr. 3, 2009), Ser. No. 11/923,629 (which was filed on Oct. 24, 2007), and Ser. No. 11/923,634 (which was filed on Oct. 24, 2007).

Figure 14:
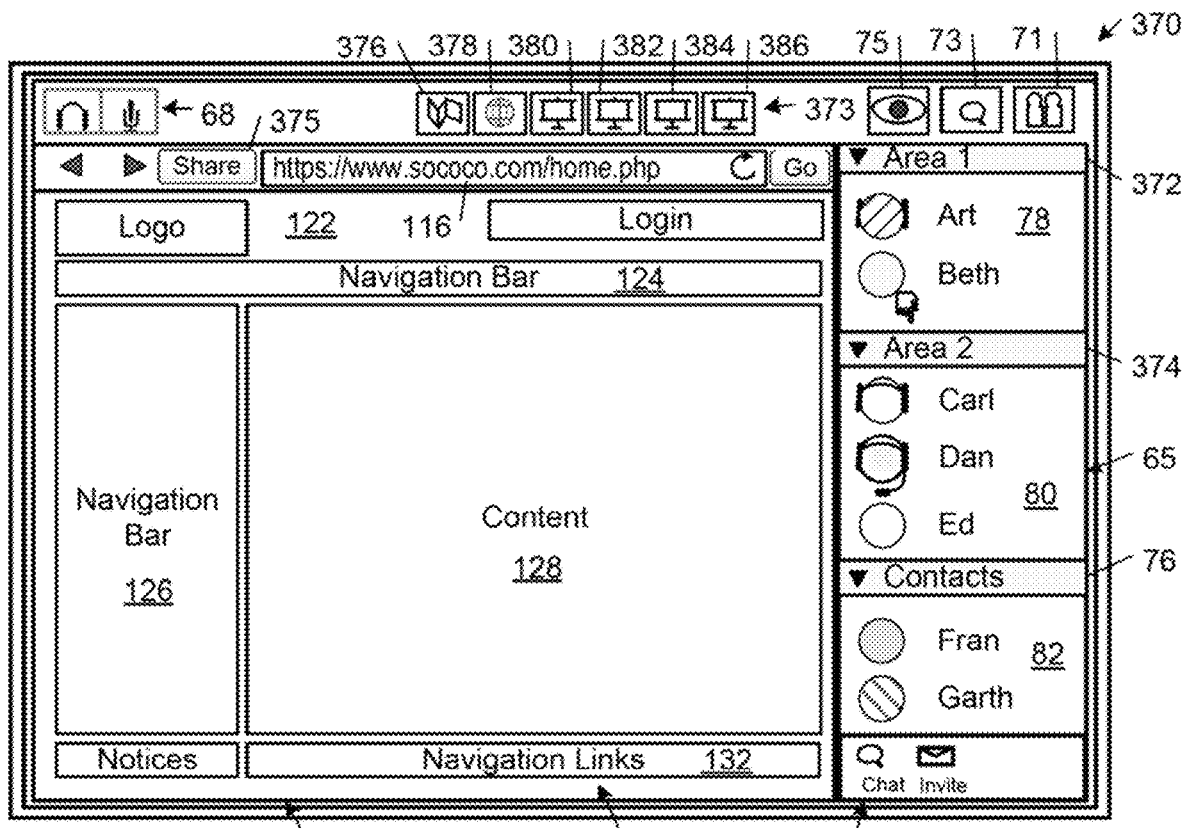
FIG. 14 is a diagrammatic view of an example of a graphical user interface.

FIG. 14 shows an exemplary graphical user interface 370 that corresponds to the graphical user interface 70 (see FIG. 6), except that server application spaces 72, 74 correspond to virtual areas 372, 374 that are associated with respective spatial visualizations.

In addition to the control and panel elements of the graphical user interface 70 (e.g., the people panel 65, the viewer panel 66, the people interaction toolbar 67, the audio interaction toolbar 68, and the panel view controls 71, 73, 75), the graphical user interface 370 includes a Share button 375 and a set 373 of Viewer Panel control buttons, including a Map button 376, a Browse button 378, and four View Screen buttons 380-386. The Share button 375 initiates a screen share of the contents of the display area 112 of the viewer panel in connection with a view screen object in a virtual area with one or more other communicants who are present in the virtual area. These contents include, for example, a web page or other network resource information that is received from the address identified in the location bar 116 by the browser component of the client application, and an application that is rendering contents (e.g., a document) on the user's display. The Map button 376 sets the view presented in the viewer panel 66 to a map view of the virtual area. The Browse button 378 sets the view presented in the viewer panel 66 to a web browser view. Each of the four View Screen buttons 380-386 sets the view presented in the viewer panel 66 to the content being shared in connection with a respective one of the view screens in the virtual area.

In the example shown in FIG. 14, the viewer panel 66 is in the web browser view mode and shows a rendered view of the information resource (a web page in this example) that is located at the URL https://www.sococo.com/home.php, as indicated in the location bar 116.

Figure 15:
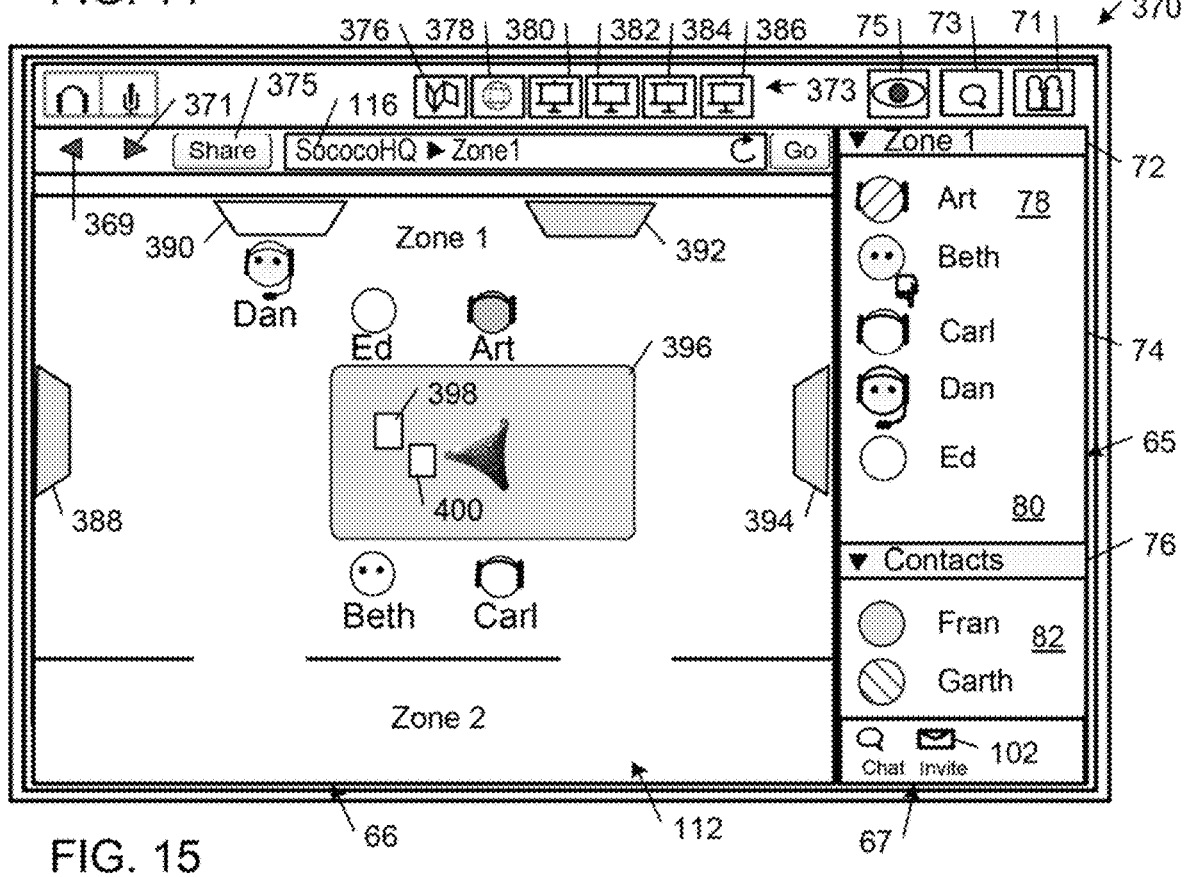
FIG. 15 is a diagrammatic view of an example of a graphical user interface.

FIG. 15 shows an example of the graphical user interface 370 in the Map view mode presenting in the viewer panel 66 a rendered view of an example of a zone (Zone 1) that is located at the location SococoHQ/Zone1, as indicated in the location bar 116. This address indicates that Zone1 is a zone within the virtual area SococoHQ.

Each of the communicants present in the virtual area is represented graphically by a respective avatar that corresponds to the communicant's avatar that is shown in the people panel 65. The virtual area is represented graphically by a two-dimensional top view of a rectangular space. In the illustrated example, when the communicants initially enter a zone of the virtual area, their sprites automatically are positioned in predetermined locations (or "seats") in the zone.

Zone 1 includes four view screen props 388, 390, 392, 394 and a table prop 396. Communicants interact with the props by selecting them with an input device (e.g., by double-clicking on the props with a computer mouse, touch pad, touch screen, or the like). The view screen props 388-394 are associated with application sharing functionality of the platform that enables communicants to share applications operating on their respective client network nodes. The application sharing functionality is invoked by activation of the Share button 375. In some embodiments, the platform provides visual cues that indicate whether or not a communicant is sharing an application over an application sharing channel. In response to a communicant's selection of a view screen prop, the communicant's sprite automatically is moved to a position in the graphical representation of the zone that is adjacent the view screen prop. The position of a communicant's sprite adjacent the view screen prop indicates that the communicant currently is sharing or is about to share an application with the other communicants in the virtual area. In addition, the avatar of each communicant who is sharing an application or receiving a shared application is depicted with a pair of "eyes" to indicate that the represented communicants are viewing the content being shared in connection with the view screen props (see, e.g., the avatars of Dan and Beth). The graphical depiction of view screen prop is changed depending on whether or not an active application sharing session is occurring. For example, the depicted color of the view screen may change from light during an active application sharing session to dark when there is no application sharing taking place. Examples of the application sharing process are described in connection with FIGS. 26-28 of U.S. patent application Ser. No. 12/354,709, filed Jan. 15, 2009, and in U.S. patent application Ser. No. 12/418,270, filed Apr. 3, 2009.

The table prop 396 is associated with file share functionality of the platform that enables communicants to upload computer data files to server storage in association with the virtual area and to download data files that are associated with the virtual area from the server storage to the respective client network nodes. In example shown in FIG. 15, there are two document objects 398, 400 that are associated with the table prop 396. The document objects 398, 400 are linked to respective documents that are have been shared in the virtual area and stored in server storage. Any of the document objects 398, 400 may be selected by a communicant (e.g., by double-clicking the document object 190 with an input device, such as a computer mouse) to initiate downloading of the associated document to the communicant's client network node. Additional details regarding the structure, function, and operation of the table prop 396 may be obtained from U.S. patent application Ser. No. 12/354,709, filed Jan. 15, 2009.

In the Map view mode shown in FIG. 15, the navigational controls of the graphical user interface 370 allow the user to traverse a path through the virtual environment in accordance with a navigational model that is tied to the underlying spatial hierarchy of virtual area locations and objects (e.g., props) within the locations. The network infrastructure service environment records the path traversed by the user. In some embodiments, the network infrastructure service environment records a history that includes a temporally ordered list of views of the virtual area locations that are presented to the user as the user navigates through the virtual area. Each view typically corresponds to a view of a respective renderable zone of the virtual area. In these embodiments, the navigation controls enable the user to move to selected ones of the zones in the history. The navigation controls also include a graphical representation of a depth path that shows the location in the spatial hierarchy that corresponds to the user's current view of the virtual area. In some embodiments, the graphical representation of the depth path includes a respective user-selectable link to a respective view of each of the preceding levels in the spatial hierarchical model of the virtual area above the current view. The back button 369 corresponds to a backward control that enables the user to incrementally move backward to preceding ones of the zones in the history of the zones that were traversed by the user. The forward button 371 corresponds to a forward control that enables the user to incrementally move forward to successive ones of the zones in the history of the zones that were traversed by the user. Some examples additionally include a placemarks button that activates a placemarking control for storing links to zones and a placemark navigation control for viewing a list of links to previously placemarked zones. In response to user selection of the placemarking control, a placemark is created by storing an image of the location shown in the current view in association with a hyperlink to the corresponding location in the virtual area. In response to a user selection of the placemark navigation control, a placemarks window is presented to the user. The placemarks window includes live visualizations of all locations that have been placemarked by the user. Each of the images in the placemarks window is associated with a respective user-selectable hyperlink. In response to user selection of one of the hyperlinks in the placemarks window, a view of the virtual area corresponding to the location associated with the selected hyperlink is automatically displayed in the browsing area of the graphical user interface 370. Some examples include home button corresponds to a control that returns the user to a view of a designated "home" location in the virtual environment. Additional details regarding the structure, function, and operation of examples of the navigation controls are described in U.S. patent application Ser. No. 12/354,709, filed Jan. 15, 2009.

Figure 16:
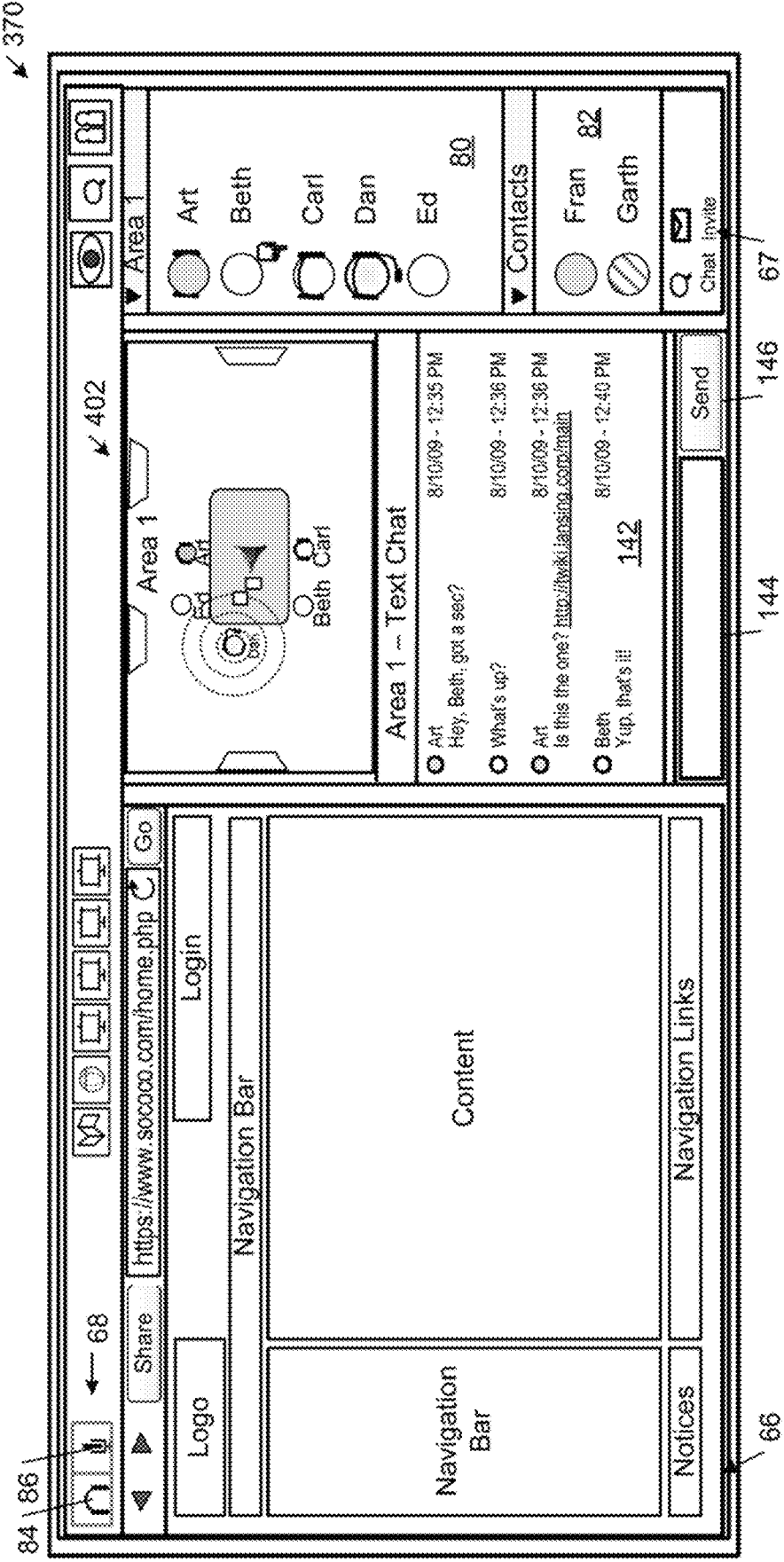
FIG. 16 is a diagrammatic view of an example of a graphical user interface.

FIG. 16 shows an example of the graphical user interface 370 when the people panel 65, a chat panel 402, and the viewer panel 66 are open. The chat panel 402 corresponds to the chat panel 140 (see FIG. 7), except that in addition to showing the chat log area 142, the text box 144, and the Send button 146, the chat panel 402 includes a minimap view of the current zone (Zone 1) in which the user is present. In this example, the user may enter text messages in the text box 144 and activate the Send button 146 to transmit the text messages to the communications applications of other communicants who are present in Zone 1.

In some examples, the client communications application 28 integrates user preferences, profile information, navigation marks, and contact information such that this information can be used across the realtime communications, network browsing (e.g., web browsing), and virtual location browsing interaction modalities.

Figure 17:
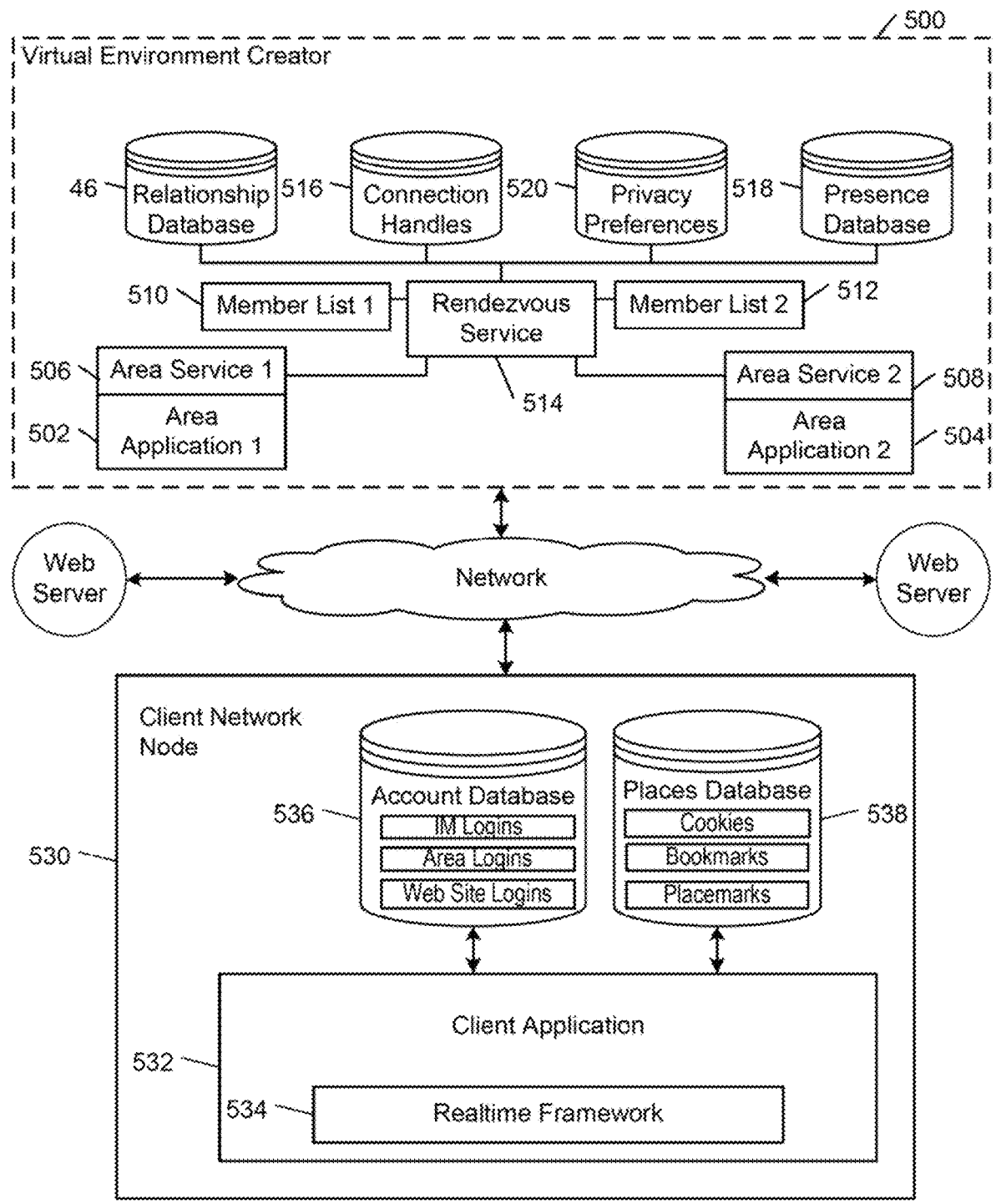
FIG. 17 is a block diagram of an example of a virtual environment creator and an example of a client network node.

FIG. 17 shows an embodiment 500 of the virtual environment creator 302 that provides a virtual area based realtime communications environment for client network nodes, including an example 530 of the client network node 12.

The virtual environment creator 500 includes two different virtual area-based server applications 502, 504 (Area Application 1 and Area Application 2). Each area application 502, 504 is associated with a respective member list 510, 512. The area-based server applications 502, 504 are administered by respective instances 506, 508 of the area service.

The area service instances 506, 508 cooperate with the rendezvous service 514 and other services of the network infrastructure service environment 306 to create different respective virtual areas for realtime communications between communicants. In some embodiments, the area service manages network connections that are associated with the virtual areas subject to the capabilities of the requesting entities, maintains global state information for the virtual area, and serves as a data server for the client network nodes participating in a shared communication session in a context defined by the virtual areas. The global state information includes a list of all the objects that are in the virtual area and their respective locations in the virtual area. The area service sends instructions that configure the client network nodes. The area service also registers and transmits initialization information to other client network nodes that request to join the communication session. In this process, the area service may transmit to each joining client network node a list of components (e.g., plugins) that are needed to render the virtual area 308 on the client network node in accordance with the virtual area application 310. The area service also ensures that the client network nodes can synchronize to a global state if a communications fault occurs. The area service typically manages communicant interactions with virtual areas via governance rules that are associated with the virtual areas.

The rendezvous service 514 maintains the relationship database 46, the member lists 510, 512, and manages the collection, storage, and distribution of presence information and provides mechanisms for network nodes to communicate with one another (e.g., by managing the distribution of connection handles 516) subject to the capabilities of the requesting entities. The rendezvous service 514 typically stores the presence information in a presence database 518. The rendezvous service 514 typically manages communicant interactions with each other via communicant privacy preferences 520.

The client network node 530 includes an example 532 of the client communications application 160 that includes an example 534 of the realtime framework 166. In some examples, the client communications application 160 maintains for each user of the client network node 530 records that are stored in an account data file 536 and a places data file 538, which may be implemented by separate data files (e.g., extensible markup language (XML) documents) or integrated into a single data file. For each user, the account data file 536 integrates account information across different communication modalities, including instant messaging login information, virtual area service login information, and web site login information. For each user, the places data file 538 integrates navigation related information (e.g., navigation history and user designated favorite places) across different communication modalities, including web browser cookies, URI bookmarks for web addresses to which the user browsed via the integrated network browser components of the client application 532, and virtual area placemarks for virtual area locations in the virtual area environment to which the user browsed via the integrated virtual area navigation components of the client application 532. By automatically managing the account and place information across the different communication modalities, the client application 532 avoids the need for the user to keep separate sets of user information for each mode of interaction, which would be required if separate applications were used for each communication modality.

In other examples, the virtual environment creator 500 maintains the account data file 536 and the places data file 538 for each user.

Other examples are within the scope of the claims.

The invention claimed is:

1. A method performed by a client network node executing a client application integrating web browsing and network data stream processing for realtime communications, the method comprising:

navigating to an address of a web page to establish a presence for a first user of a first client network node in a virtual area hosted by a server network node executing a server application comprising a specification of the virtual area and one or more switching rules specifying one or more respective connections or disconnections of one or more data sources and one or more data sinks of client network nodes of users who are present in the virtual area;

based on the established presence for the first user, automatically establishing a communications connection with a second client network node of a second user who is present in the virtual area;

tracking realtime availabilities and activities of the second user;

presenting information representing the tracked realtime availabilities and activities of the second user in a realtime visual cue depicted in association with a graphical representation of the second user;

transmitting outgoing data streams to and receiving incoming data streams from the second client network node over the communications connection, wherein the incoming and outgoing data streams comprise one or more time-critical types of data streams and one or more non-time-critical types of data streams, wherein data streams are pre-assigned as time-critical or non-time critical based on the type of the data stream and the time-critical type data streams include audio and video data streams;

processing the one or more time-critical types of data streams and the one or more non-time-critical types of data streams;

monitoring at least one metric characterizing transmission of one or more data streams over the communications connection between the first client network node and the second client network node;

allocating relative amounts of available network resources between the time-critical data streams and non-time-critical data streams;

managing relative amounts of the available network resources that are allocated between the time-critical data streams and non-time-critical data streams by dynamically influencing allocation of available bandwidth between time-critical realtime data streams and non-time-critical data streams; and based on a determination that the at least one metric fails to satisfy at least one performance target, throttling a rate at which packets of at least one of the time-critical types of data streams and the non-time-critical types data streams are provided to a network layer of the first client network node in accordance with the allocation of available bandwidth between time-critical realtime data streams and non-time-critical data streams such that latency in delivery of time-critical data streams is less than latency in delivery of non-time-critical data streams.

2. The method of claim 1, wherein monitoring the at least one metric comprises monitoring a bandwidth metric corresponding to a measure of bandwidth.

3. The method of claim 2, wherein the monitoring comprises determining a value of the bandwidth metric based on data rates over the communications connection.

4. The method of claim 3, wherein the performance target is a threshold data rate.

5. The method of claim 2, wherein the monitoring comprises determining a value of the bandwidth metric based on a count of dropped packets.

6. The method of claim 2, wherein the performance target is maximum number of dropped packets.

7. The method of claim 1, wherein the communications connection between the first and second client network nodes is a peer-to-peer communications connection.

8. The method of claim 1, further comprising adjusting the processing based on a determination that the at least one metric fails to satisfy at least one operational performance target.

9. The method of claim 8, wherein the adjusting comprises increasing a level of compression applied to at least one of the time-critical types of data streams and the non-time-critical types data streams.

10. The method of claim 8, wherein the adjusting comprises decreasing a data rate at least one of the time-critical types of data streams and the non-time-critical types data streams.

11. The method of claim 1, wherein throttling comprises initiating a packet throttling operational mode comprising: starting a current cycle with an initial bandwidth budget; on condition that there is a time-critical packet currently queued to transmit and there is sufficient bandwidth budget available in the current cycle, transmitting the time-critical packet and reducing the bandwidth budget for the current cycle by an amount corresponding the transmitted packet; and, on condition that no time-critical packet currently is queued to send, there is a non-time-critical packet queued to send, and there is sufficient bandwidth budget available in the current cycle, sending the non-time-critical packet and reducing the bandwidth budget for the current cycle by an amount corresponding to the sent packet.

12. A computer-readable data storage apparatus comprising a memory component storing executable instructions that are operable to be executed by a processor integrating web browsing and network data stream processing for realtime communications, wherein the memory component comprises:

executable instructions to navigate to an address of a web page to establish a presence for a first user of a first client network node in a virtual area hosted by a server network node executing a server application comprising a specification of the virtual area and one or more switching rules specifying one or more respective connections or disconnections of one or more data sources and one or more data sinks of client network nodes of users who are present in the virtual area;

executable instructions to, based on the established presence for the first user, automatically establish a communications connection with a second client network node of a second user who is present in the virtual area;

executable instructions to track realtime availabilities and activities of the second user;

executable instructions to present information representing the tracked realtime availabilities and activities of the second user in a realtime visual cue depicted in association with a graphical representation of the second user;

executable instructions to transmit outgoing data streams to and receive incoming data streams from the second client network node over the communications connection, wherein the incoming and outgoing data streams comprise one or more time-critical types of data streams and one or more non-time-critical types of data streams, wherein data streams are pre-assigned as time-critical or non-time critical based on the type of the data stream and the time-critical type data streams include audio and video data streams;

executable instructions to process the one or more time-critical types of data streams and the one or more non-time-critical types of data streams;

executable instructions to monitor at least one metric characterizing transmission of one or more data streams over the communications connection between the first client network node and the second client network node;

executable instructions to allocate relative amounts of available network resources between the time-critical data streams and non-time-critical data streams;

executable instructions to manage relative amounts of the available network resources that are allocated between the time-critical data streams and non-time-critical data streams by dynamically influencing allocation of available bandwidth between time-critical realtime data streams and non-time-critical data streams; and executable instructions to, based on a determination that the at least one metric fails to satisfy at least one performance target, throttle a rate at which packets of at least one of the time-critical types of data streams and the non-time-critical types data streams are provided to a network layer of the first client network node in accordance with the allocation of available bandwidth between time-critical realtime data streams and non-time-critical data streams such that latency in delivery of time-critical data streams is less than latency in delivery of non-time-critical data streams.

13. The computer-readable data storage apparatus of claim 12, further comprising executable instructions to determine a value of the bandwidth metric based on data rates over the communications connection, and wherein the performance target is a threshold data rate.

14. The computer-readable data storage apparatus of claim 12, further comprising executable instructions to determine a value of the bandwidth metric based on a count of dropped packets, and wherein the performance target is maximum number of dropped packets.

15. The computer-readable data storage apparatus of claim 12, further comprising executable instructions to adjust the processing based on a determination that the at least one metric fails to satisfy at least one operational performance target.

16. A system, comprising
one or more processors; and
a memory, coupled to the one or more processors, having code stored therein, wherein when the code is executed by the one or more processors, the one or more processors perform operations comprising:

navigate to an address of a web page to establish a presence for a first user of a first client network node in a virtual area hosted by a server network node executing a server application comprising a specification of the virtual area and one or more switching rules specifying one or more respective connections or disconnections of one or more data sources and one or more data sinks of client network nodes of users who are present in the virtual area;

based on the established presence for the first user, automatically establish a communications connection with a second client network node of a second user who is present in the virtual area;

track realtime availabilities and activities of the second user;

present information representing the tracked realtime availabilities and activities of the second user in a realtime visual cue depicted in association with a graphical representation of the second user;

transmit outgoing data streams to and receiving incoming data streams from the second client network node over the communications connection, wherein the incoming and outgoing data streams comprise one or more time-critical types of data streams and one or more non-time-critical types of data streams, wherein data streams are pre-assigned as time-critical or non-time critical based on the type of the data stream and the time-critical type data streams include audio and video data streams;

a processor arranged to:
  process the one or more time-critical types of data streams and the one or more non-time-critical types of data streams;
  monitor at least one metric characterizing transmission of one or more data streams over the communications connection between the first client network node and the second client network node;
  allocate relative amounts of available network resources between the time-critical data streams and non-time-critical data streams;
  manage relative amounts of the available network resources that are allocated between the time-critical data streams and non-time-critical data streams by dynamically influencing allocation of available bandwidth between time-critical realtime data streams and non-time-critical data streams; and
  based on a determination that the at least one metric fails to satisfy at least one performance target, throttle a rate at which packets of at least one of the time-critical types of data streams and the non-time-critical types data streams are provided to a network layer of the first client network node in accordance with the allocation of available bandwidth between time-critical realtime data streams and non-time-critical data streams such that latency in delivery of time-critical data streams is less than latency in delivery of non-time-critical data streams.

17. The system of claim 16, wherein the processor is arranged to determine a value of the bandwidth metric based on data rates over the communications connection, and the performance target is a threshold data rate.

18. The system of claim 16, wherein the processor is arranged to determine a value of the bandwidth metric based on a count of dropped packets, and the performance target is maximum number of dropped packets.

19. The system of claim 16, wherein the processor is further arranged to adjust the processing based on a determination that the at least one metric fails to satisfy at least one operational performance target.

* * * * *